US011803802B2

(12) United States Patent
Crone

(10) Patent No.: US 11,803,802 B2
(45) Date of Patent: Oct. 31, 2023

(54) SYSTEM AND METHOD FOR DELIVERING ITEMS USING AUTONOMOUS VEHICLES AND RECEPTACLE TARGETS

(71) Applicant: United States Postal Service, Washington, DC (US)

(72) Inventor: Donald E. Crone, Frederick, MD (US)

(73) Assignee: United States Postal Service, Washington, DC (US)

( * ) Notice: Subject to any disclaimer, the term of this patent is extended or adjusted under 35 U.S.C. 154(b) by 180 days.

(21) Appl. No.: 17/198,846

(22) Filed: Mar. 11, 2021

(65) Prior Publication Data

US 2021/0201249 A1 Jul. 1, 2021

Related U.S. Application Data

(63) Continuation of application No. 15/859,956, filed on Jan. 2, 2018, now Pat. No. 10,949,792.

(60) Provisional application No. 62/569,189, filed on Oct. 6, 2017, provisional application No. 62/440,897, filed on Dec. 30, 2016.

(51) Int. Cl.
*G06Q 10/08* (2023.01)
*G06Q 10/083* (2023.01)
*G06Q 10/047* (2023.01)
*G06Q 10/0835* (2023.01)

(52) U.S. Cl.
CPC ......... *G06Q 10/083* (2013.01); *G06Q 10/047* (2013.01); *G06Q 10/08355* (2013.01)

(58) Field of Classification Search
CPC ............. G06Q 10/083; G06Q 10/047; G06Q 10/08355; G06Q 50/30; G07C 9/00174; G07C 2009/00769; G07C 2009/0092
See application file for complete search history.

(56) References Cited

U.S. PATENT DOCUMENTS

| 9,244,147 | B1 | 1/2016 | Soundararajan et al. |
| 9,688,288 | B1 | 6/2017 | Lathrop et al. |
| 10,245,993 | B1 * | 4/2019 | Brady ............. B60P 7/13 |
| 10,248,120 | B1 | 4/2019 | Siegel et al. |
| 2003/0102957 | A1 * | 6/2003 | Crisp ............. G07C 9/00309 340/5.2 |

(Continued)

FOREIGN PATENT DOCUMENTS

WO  WO-0068856 A2 * 11/2000 ....... G06F 17/30902

OTHER PUBLICATIONS

USPS Office of Inspector General, "Autonomous Vehicles for the Postal Service," Oct. 2, 2017, https://www.uspsoig.gov/sites/default/files/document-library-files/2017/RARC-WP-18-001.pdf (Year: 2017).*

(Continued)

*Primary Examiner* — Resha Desai
*Assistant Examiner* — Michelle E Carey
(74) *Attorney, Agent, or Firm* — Knobbe Martens Olson & Bear LLP

(57) ABSTRACT

An autonomous vehicle for delivery of items can detect its location and the location of targets on item receptacles in order to position the vehicle at a receptacle. The vehicle, in an autonomous mode, can automatically travel between delivery points along a delivery route. A presence sensor on the vehicle can detect ingress and egress from the vehicle to determine when the vehicle is ready to travel to the next delivery point.

16 Claims, 9 Drawing Sheets

(56) References Cited

U.S. PATENT DOCUMENTS

| | | |
|---|---|---|
| 2015/0248640 A1 | 9/2015 | Srinivasan |
| 2015/0269521 A1* | 9/2015 | Knapp ............. G06Q 10/08355 |
| | | 705/338 |
| 2015/0321595 A1 | 11/2015 | Hempsch et al. |
| 2016/0297444 A1 | 10/2016 | Endo et al. |
| 2017/0011333 A1 | 1/2017 | Greiner et al. |
| 2017/0278063 A1 | 9/2017 | Dixon et al. |
| 2019/0043370 A1* | 2/2019 | Mulhall ................. G01C 21/20 |

OTHER PUBLICATIONS

O'Connor, M. L. (1998). Carrier-phase differential GPS for automatic control of land vehicles (Order No. 9837237). Available from ProQuest Dissertations and Theses Professional. (304454338). Retrieved from https://dialog.proquest.com/professional/docview/304454338?accountid=131444 (Year: 1998).

Buijs, P., & J.C. ("Hans") Wortmann. (2014). Joint operational decision-making in collaborative transportation networks: The role of IT. Supply Chain Management, 19(2), 200-210. doi:http://dx.doi.org/10.1108/SCM-08-2013-0298 (Year: 2014).

\* cited by examiner

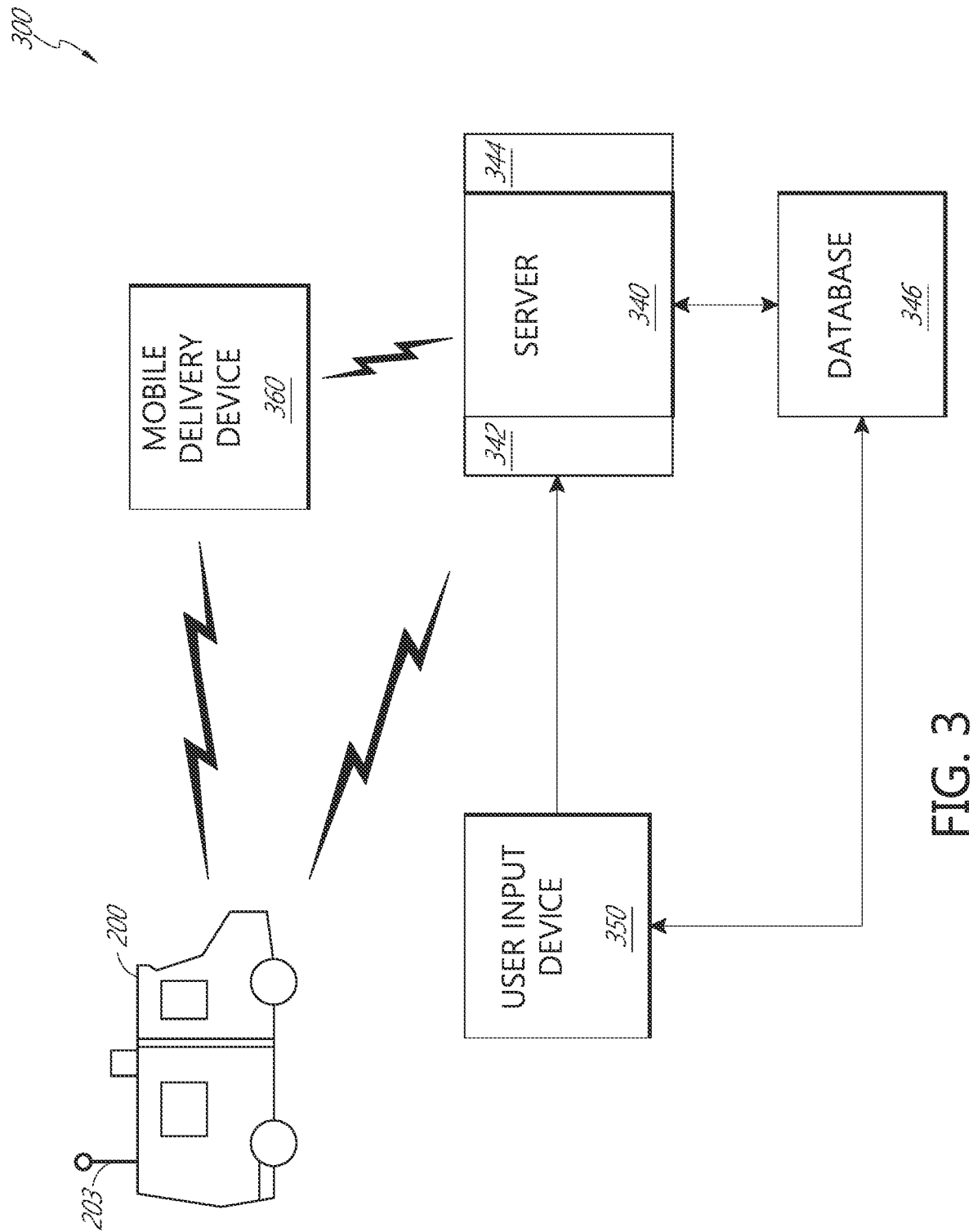

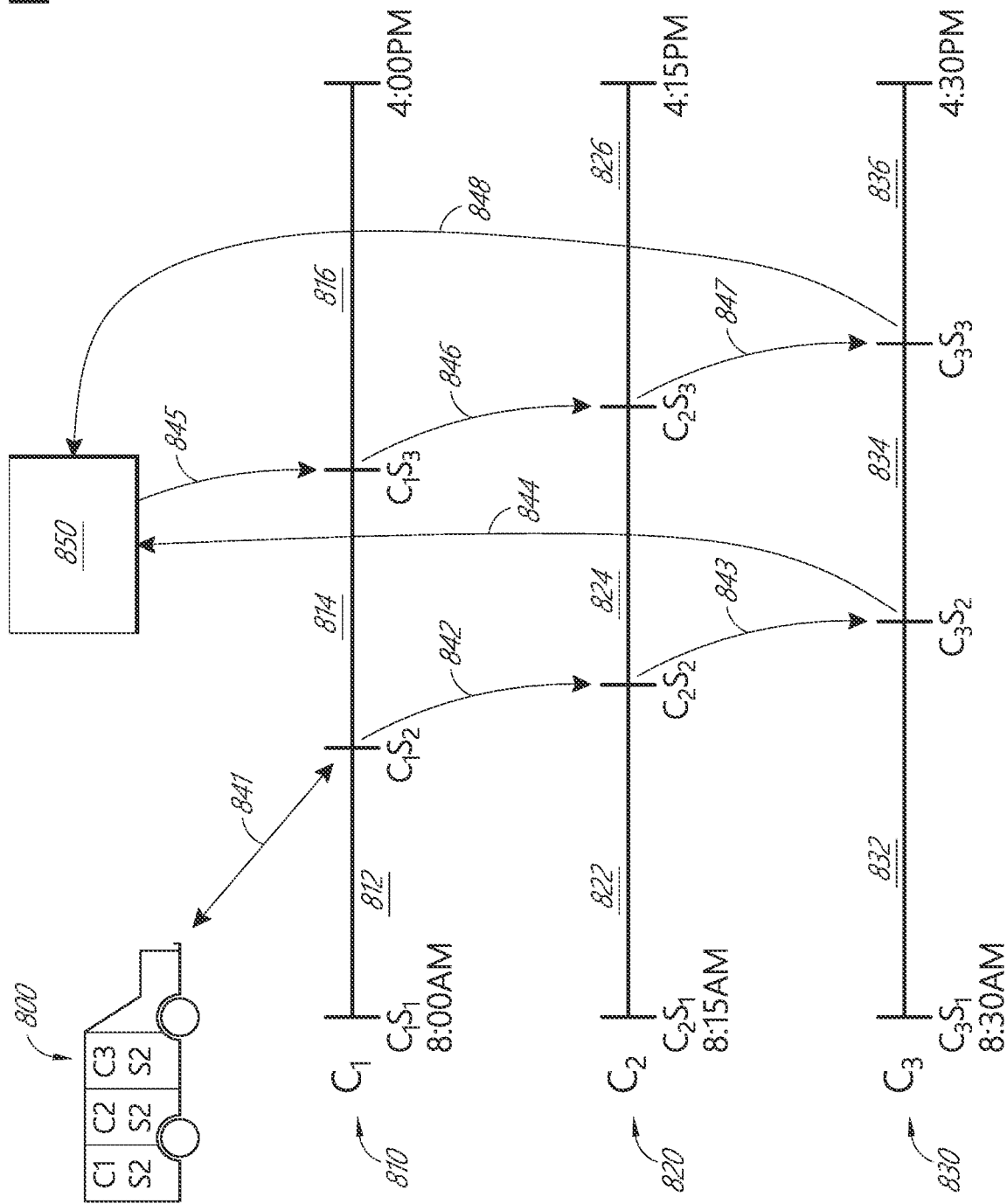

SYSTEM AND METHOD FOR DELIVERING ITEMS USING AUTONOMOUS VEHICLES AND RECEPTACLE TARGETS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 15/859,956, now U.S. Pat. No. 10,949,792, filed Jan. 2, 2018, which, in turn, claims the benefit of priority to U.S. Provisional Application Nos. 62/440,897, filed Dec. 30, 2016 and 62/569,189, filed Oct. 6, 2017.

BACKGROUND

This disclosure relates to the field of item delivery using autonomous or semi-autonomous vehicles.

SUMMARY OF THE INVENTION

In one aspect described herein, an autonomous delivery vehicle comprises a a location sensor configured to detect the location of the delivery vehicle; a target sensor on the vehicle configured to detect a target associated with a receptacle and to receive a signal in response to detecting the target; and a processor configured to determine the location of the receptacle based on the received signal; and automatically move the vehicle to the determined location.

In some embodiments, the location sensor is configured to determine when the autonomous delivery vehicle is within a geofence corresponding to the receptacle.

In some embodiments, the target sensor is configured to detect the target associated with the receptacle when the vehicle is determined to be within the geofence corresponding to the receptacle.

In some embodiments, the location sensor is configured to detect geospatial coordinates of the vehicle.

In some embodiments, the target sensor is configured to detect the received signal reflected from the target on the receptacle.

In some embodiments, the received signal comprises specific location information of the receptacle.

In some embodiments, the processor is further configured to move the vehicle to the determined location based on the received specific location information of the receptacle.

In some embodiments, the processor is configured to receive a delivery confirmation and to autonomously move the vehicle to a next receptacle along a route.

In some embodiments, the autonomous vehicle further comprises a presence sensor attached near a door of the delivery vehicle configured to detect a presence in the door of the delivery vehicle, and to initiate vehicle actions in response to the detected presence.

In another aspect described herein, a method of delivering an item comprises determining a location of an autonomous vehicle using a location sensor; moving the autonomous delivery vehicle in proximity to a delivery receptacle; interrogating, using a target sensor, a target associated with a delivery receptacle; receiving a signal from the target in response to the interrogating; determining the location of the receptacle based on the received signal; and automatically moving the vehicle to the determined location.

In some embodiments, determining the location of the autonomous vehicle comprises determining when the autonomous delivery vehicle is within a geofence corresponding to the receptacle.

In some embodiments, interrogating the target occurs in response to determining when the vehicle is within the geofence corresponding to the receptacle.

In some embodiments, the location sensor determines the location of the autonomous vehicle by determining geospatial coordinates of the vehicle.

In some embodiments, the received signal from the target comprises specific location information of the delivery receptacle.

In some embodiments, determining the location of the receptacle comprises determining the location using the received specific location information of the delivery receptacle.

In some embodiments, the method further comprises receiving a delivery confirmation and autonomously moving the vehicle to a next delivery receptacle along a route in response to receiving the delivery confirmation.

In some embodiments, the method further comprises detecting, via a presence sensor attached near a door of the delivery vehicle, a presence in the door of the delivery vehicle, and initiating vehicle actions in response to the detected presence.

In another aspect described herein, a method of delivering items comprises moving an autonomous delivery vehicle having a plurality of items thereon to a first delivery point; determining a location of a first delivery receptacle at the first delivery point based on a detected signal from a target located on the first delivery receptacle; aligning the autonomous delivery vehicle with the first delivery receptacle based on the determined location of the first delivery receptacle; delivering one or more items from the plurality of items to the first delivery receptacle; receiving a confirmation of item delivery to the first delivery receptacle; moving the autonomous vehicle to a second delivery point in response to receiving the confirmation of item delivery; sorting items intended for delivery to the second delivery point as the vehicle moves to the second delivery point; determining a location of a first delivery receptacle at the second delivery point based on a detected signal from a target located on the second delivery receptacle; and delivering the sorted items to the second delivery receptacle.

In some embodiments, receiving the confirmation of item delivery to the first delivery receptacle comprises scanning, using a mobile delivery device, one or more items as the one or more items are delivered to the first delivery receptacle; and receiving a scan signal from a mobile delivery device.

In some embodiments receiving the confirmation of item delivery to the first delivery receptacle comprises receiving a signal from a presence detector located on the autonomous delivery vehicle.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 3 is a block diagram illustrating one embodiment of a network to communicate with an autonomous vehicle.

FIG. 8 is a chart depicting an embodiment of vehicle and carrier routes.

DETAILED DESCRIPTION

Figure 1:
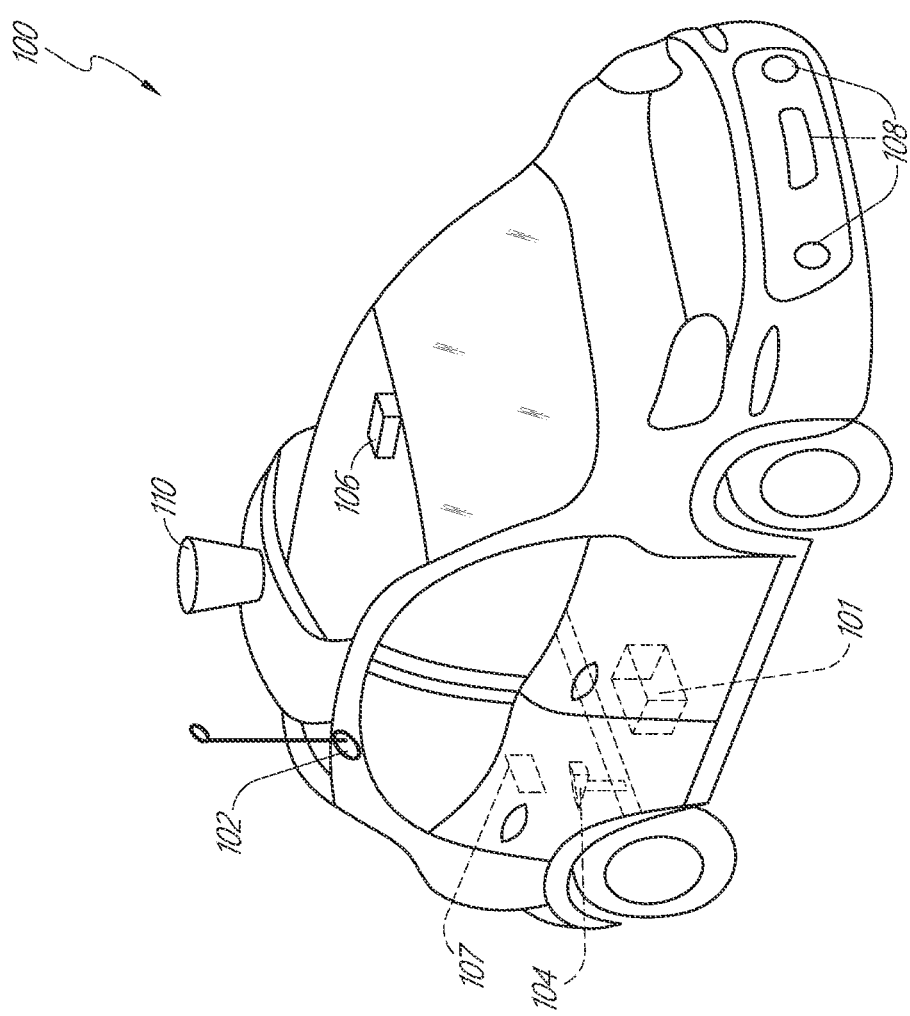
FIG. 1 depicts a perspective view of an embodiment of an autonomous vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Some embodiments herein relate to delivery of items using autonomous or semi-autonomous vehicles. Some embodiments described herein include a delivery vehicle that has a configurable interior, for example, a steering wheel that can be retracted or folded to open space for a delivery resource to sort, organize, categorize, or stage items for delivery. Some embodiments herein relate to a target or identifier on a receptacle, house, commercial building, apartment, or any other location configured to receive delivery of an item.

Items are currently delivered by various distribution entities who deliver to receptacles, such as mailboxes, to doorsteps, to individualized boxes, and the like. In the case of the United States Postal Service (USPS), a delivery resource, such as a carrier, delivers to multiple addresses within a geographic area every day. Frequently the delivery resource is assigned to a route, which includes a particular set of delivery points, such as addresses of businesses, residences, and the like. Delivery resources may drive a vehicle to the beginning of the assigned delivery route, and then drive the vehicle along the route, stopping at each delivery point to deliver the items intended for delivery to each delivery point. A delivery resource may need to sort items intended for delivery at each location. Although sorting according to the delivery route may have been performed at a delivery facility, such as a post office, the delivery resource may still need to separate the stack of all the items to be delivered on the delivery route into smaller, segregated groups comprising items for delivery to each address. The delivery resource may repeat at least portions of these same actions at each delivery point.

For example, a tray (or multiple trays) may have been loaded onto a delivery vehicle at a delivery facility, with the tray containing all or a portion of the items intended for delivery points along a particular delivery route. At each stop, the delivery resource must identify which of the stack of all the items are intended for delivery to a particular delivery point, collect only those items, and place these items in a receptacle, on a doorstep, or in another designated location associated with the delivery point. The delivery resource then drives to the next delivery point along the route, or for which there are items intended for delivery. This process can slow the carrier's progress along a route, costing efficiency, as the delivery resource spends time at each delivery point sorting items. By using an autonomous vehicle, or a semi-autonomous vehicle, the time spent in transit between delivery points is used to sort items for upcoming delivery points, improving the efficiency of item delivery.

Also, again using the USPS as an example, a carrier can drive a vehicle to a beginning point of a delivery route. The carrier can reconfigure the driver compartment to move the steering wheel and prepare a staging area. The carrier can retrieve the tray of items intended for delivery along the route and place it in or on the staging area. The carrier initiates an autonomous driving mode, and the vehicle identifies the location of the next receptacle, and drives to the upcoming delivery point without further input from the carrier. As the vehicle is driving to the upcoming delivery point, the carrier sorts, isolates, consolidates, obtains, segregates, or identifies the items intended for delivery at the upcoming delivery point. The vehicle has a sensing system to identify the exact location of the receptacle, for example, the mailbox, for the items, and when the vehicle is aligned with the receptacle, the vehicle stops. With the vehicle stopped, the carrier can deposit the items into the mailbox, can deliver a package to the doorstep, etc. The carrier then re-initiates autonomous mode, and the vehicle begins driving to the next delivery point, and the process repeats itself. This process will be described in greater detail below.

As used herein, an autonomous vehicle may be fully autonomous and require no input from a driver via a steering wheel, accelerator, or brakes, or may be semi-autonomous, that is, may be controllable by a driver, and then put into an autonomous mode. The terms autonomous and semi-autonomous can be used interchangeably throughout this disclosure. Also as used herein, the term item can refer to mailpieces, envelopes, flats, packages, parcels, or any other deliverable object or commodity.

FIG. 1 is a perspective view of an embodiment of an autonomous vehicle useable for delivery of items. The vehicle 100 comprises a central computer 101, and a plurality of sensors and detectors in communication with the central computer, which will be described below. The central computer 101 is in wireless communication with a network as shown in FIG. 3. The connection can be a cellular, 3G, 4G, LTE, Wi-Fi, or any other desired communication type or format. The central computer 101 controls all of the vehicle's functions, including steering, acceleration, braking, signaling, and the like, using input and feedback from the sensors described below.

The vehicle 100 comprises a location sensor 102. The location sensor 102 is in communication with the central computer 101. The location sensor can be a global positioning system (GPS), or other spatial location system, including GLONASS, a multilateration system, LORAN, triangulation, and the like. The vehicle also comprises an odometer sensor 104 in communication with the central computer 101 which tracks how far the vehicle 100 has traveled according to movement of the vehicle's axels, wheels, and the like. The vehicle 100 comprises a sensor such as a video camera 106 for capturing video or images, the sensor in communication with the central computer 101. The video camera 106 can observe road conditions, monitor the vehicle's surroundings, and read traffic signals, such as signs and lights. The video camera 106 can be a stereo camera configured to determine distances, triangulate position, and interpret depth and distance of objects within the field of view. The vehicle 100 further comprises ultrasonic sensors 107 and radar sensors 108 which are in communication with the central computer 101. The ultrasonic sensors 107 and radar sensors 108 can be used to detect how far the vehicle is from an object, to monitor the surroundings, such as the road, lane lines, other vehicles, pedestrians, and the like. The placement of the ultrasonic sensors 107 and radar sensors 108 in FIG. 1 is exemplary only.

The vehicle 100 also comprises a target sensor 110, which can identify the locations of item receptacles, or identify targets on item receptacles. The target sensor 110 can be a radar detector, RF detector, and the like. In some embodiments, the target sensor 110 can advantageously use a LIDAR system to identify the locations of receptacles. The target sensor 110 can also be configured to interrogate a receptacle, or a sensor on a receptacle, and read a response provided by a component of the receptacle. For example, the item receptacle may have an RF tag thereon, the RF tag storing specific instructions. The target sensor 110 can activate the tag, in the case of a passive RF tag, read the emitted signal from the RF tag, and transmit the information from the emitted signal to the central computer 101.

The vehicle depicted in FIG. 1 and the relative placement of components is exemplary only. In some embodiments, the vehicle 100 is a delivery vehicle, such as a truck, a van, a cart, or any other desired type of vehicle.

Figure 2A:
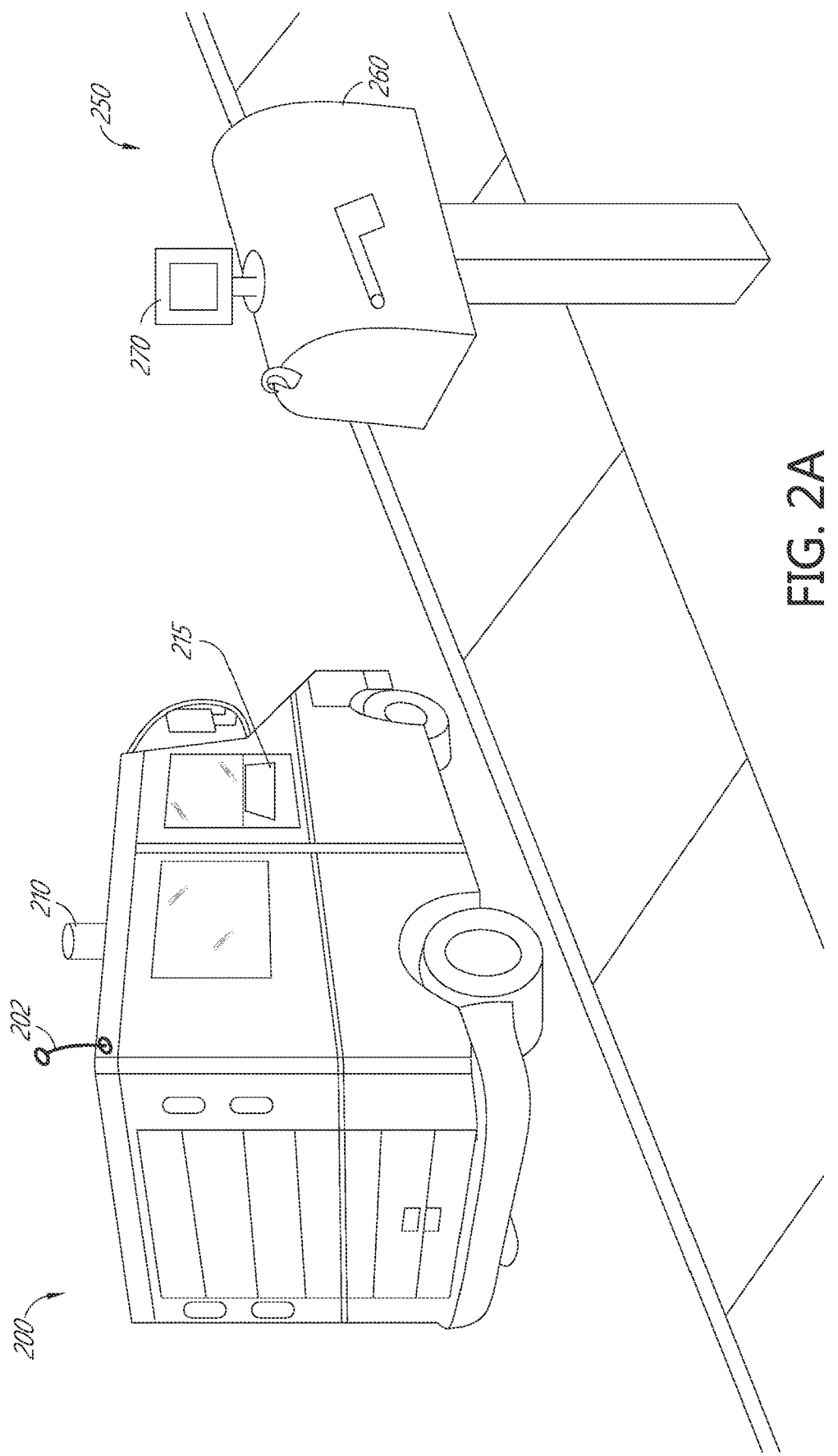
FIG. 2A depicts perspective view of a vehicle incorporating an embodiment of a system for identifying the location of a receptacle.

FIG. 2A depicts a perspective view of a vehicle which includes an embodiment of a system for identifying the location of an item receptacle. A vehicle 200 comprises a central computer 201 (see FIG. 2B), a location sensor 202, and a target sensor 210. The vehicle 200 may be similar to those and include components similar to those described elsewhere herein. The vehicle 200 can be assigned to a delivery route. The delivery route can be programmed into the central computer 201. The delivery route comprises a plurality of delivery points within a defined geographical area. A receptacle 250 may be present at each delivery point.

The receptacle 250 may be a mailbox, a bin, a designated area of a warehouse or dock, and the like. In some embodiments, the delivery point may be a doorstep of a residence or commercial building. In the case where there is no physical receptacle, a defined area or specific place at the delivery point can be referred to as the receptacle 250. The receptacle 250 comprises a container 260 for receiving an item for delivery, and a target 270.

The target 270 may include a reflector, such as a LIDAR reflector, an RF tag, a computer readable code, or other unique identifier. The target 270 may protrude from an outer surface of the container 260, or may be affixed to a surface of the container 260 like a label or a sticker can be affixed. The target 270 may be active or passive. The target 270 may encode a unique identifier, such that the target 270 uniquely identifies the receptacle 250 to the central computer 201. In some embodiments, the unique identifier encoded in the target 270 corresponds to or is associated with the delivery point. For example, the target 270 may encode additional information related to the delivery point, such as the address of the delivery point, geographic coordinates of the delivery point, the name of a resident, company, or occupant of the house, building, additional delivery instructions, etc., at the delivery point. In some embodiments, the unique identifier is an alphanumeric code, a binary code, a RF signal, or other signal that uniquely identifies the receptacle 250 to which it is attached. The unique identifier can be associated with the delivery point in a database, as will be described elsewhere herein.

Figure 2B:
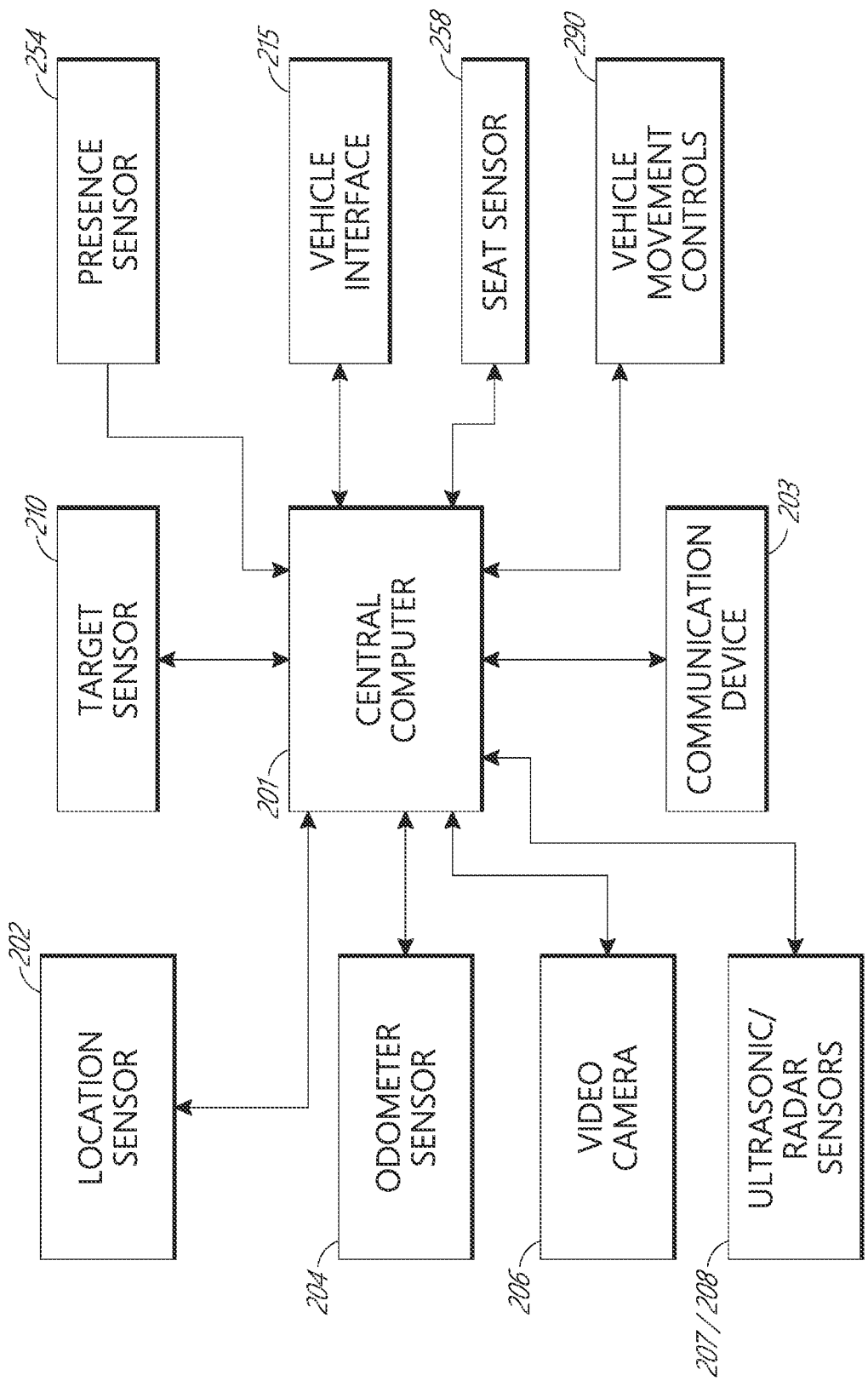
FIG. 2B is a block diagram illustrating one embodiment of electronic components of the vehicle of FIG. 2A.

FIG. 2B is an embodiment of a block diagram of network of components of the vehicle 200. The vehicle 200 comprises a vehicle network 205 which includes the components, sensors, motors, actuators, communications links, electronics, and the like for controlling and effectuating autonomous driving and the delivery functions described herein. The vehicle network 205 comprises a central computer 201. The central computer 201 comprises a processor, memory, communications pathways and modules to enable the central computer to monitor and control all the functions of the vehicle 200. In some embodiments, the central computer 201 can be embodied as a single hardware unit, or can be embodied in one or more hardware units in communication with each other. In some embodiments, the various functions of the central computer 201 described herein can be performed by separate computing devices, processors, software modules, hardware modules and the like, without departing from the scope of the present disclosure.

The central computer 201 is in electrical communication with the location sensor 202, the communication device 203, the odometer sensor 204, the video camera 206, the ultrasonic and radar sensors 207, 208, and the target sensor 210, similar to those described elsewhere herein. The central computer 201 is also in communication with a vehicle interface 215, a presence sensor 254, a seat sensor 258, and vehicle movement controls 290. The vehicle interface 215 can comprise a keyboard, mouse, touch screen, voice command, or other desired input device. The vehicle interface 215 can also comprise a visual, audible, and/or textual output device. The vehicle interface 215 receives instructions from an operator, delivery resource, or carrier as described elsewhere herein, and displays instructions, alerts, communications, and the like to the operator, delivery resource, or carrier. The vehicle interface 215 can be embodied on a computer, such as a laptop computer, a tablet computer, a smart phone, and can be mobile and removable from the vehicle 200. In some embodiments, the vehicle interface 215 can be built-in to the vehicle 200.

The presence sensor 254 can be an ultrasonic detector, a photoelectric eye, a motion detector, an infrared sensor, an optoelectronic device such as a light curtain, an ultrasonic detector, or other type of sensor configured to detect when an object is within its sensor field. The presence sensor 254 sends a signal to the central computer when the presence sensor 254 detects or senses a presence within its sensor field, or when the state of the presence sensor 254 changes. The presence sensor 254 can also send signals to the central computer 201 including the status of the sensor at a given periodicity, continuously, or upon request from the central computer 201. These signals can include whether the presence sensor 254 detects a presence, or does not detect a presence, how long a presence is/was detected, and the like.

The seat sensor 258 can comprise a detector to detect whether an item, the carrier, a delivery resource, and the like, is in the seat. The seat sensor 258 can comprise a pressure sensor, a weight sensor, an optoelectronic sensor, or any other desired sensor configured to detect a presence on a seat of the vehicle 200. The seat sensor 258 communicates the status of the seat sensor 258, at intervals, periodically, upon a change of state, or when requested by the central computer 258.

The central computer 201 is also in communication with vehicle movement controls 290, which can include acceleration, braking, steering, and any other function of a vehicle required to drive a vehicle autonomously. The central computer 201 sends signals to and receives feedback from the vehicle movement controls 290 in order to drive, navigate, or move the vehicle along the delivery route, according to guidance or input provided by the other sensors described herein.

FIG. 3 is an embodiment of a block diagram of a network to communicate with an autonomous vehicle. A network 300 comprises a server 340, a user input device 350, a mobile delivery device 360, and the vehicle 200. The server 340 is a central hub for the distribution network, and can be used for communication with one or more vehicles 200 and one or more mobile delivery devices 360. This communication can advantageously be wireless communication, but in some embodiments can be wired when the vehicle 200 or the mobile delivery device 360 is parked or docked, or not in use on a delivery route. The server 340 comprises a communication module 342 which enables the server to communicate via wired or wireless interfaces with each of the components of the network 300. The serer 340 further comprises a memory 344, which stores instructions for operation of the server 340, and can store additional information received from each of the components of the network 300 as will be described elsewhere herein.

The vehicle 200 has an onboard central computer 201, which controls all the electronic functions and driving functions of the vehicle, as described elsewhere herein. The central computer 201 also communicates with the server 340 via the communication device 203, over wireless communication pathways, such as cellular, Wi-Fi, Bluetooth, ZigBee, 3G, 4G, LTE, and the like.

The mobile delivery device 360 is a mobile computing device assigned to a delivery resource, and is used to scan items for delivery, to receive driving instructions, to interface with the vehicle 200, and the like. The mobile delivery device 360 is configured to communicate via a wired or wireless pathway with the server 340 to communicate scan events, delivery events, directions, and the like. The mobile delivery device 360 is configured to communicate with the vehicle 200 via a wireless communication protocol, such as Bluetooth, or via a wired connection, such as if the mobile delivery device 360 is docked in a dock within the vehicle 200. The carrier can interface with the vehicle 200 and give the vehicle 200 commands, such as start, stop, proceed to the next delivery point, and the like, via the mobile delivery device 360.

The server 340 is in communication with a database 346. The database 346 can store information about the delivery points within a geographical area, such as within a country, a state, a city, a zip code, and the like. The database 346 can also store delivery route information, such as the coordinates of each delivery point along a specific route, the number of delivery points on a route, the identity of the carrier assigned to a delivery route, and the like. The delivery route information stored in the database 346 can be communicated to the vehicle 200 or the mobile delivery device 360, or both.

The database 346 can be co-located with the server 340, can be part of the server 340, or can be separate from the server 340.

The user input device 350 can be a computing device, such as a computer, a cell phone running an application, a tablet computer, or other computing device that communicates via a wired or wireless connection with the server 340. A user, such as a customer or resident at a delivery point can communicate with the server 340. The user can also be a supervisor or employee of the distribution network. A supervisor may assign delivery routes, edit delivery routes, and modify or change other information stored in the memory 344 or the database 346.

Figure 4:
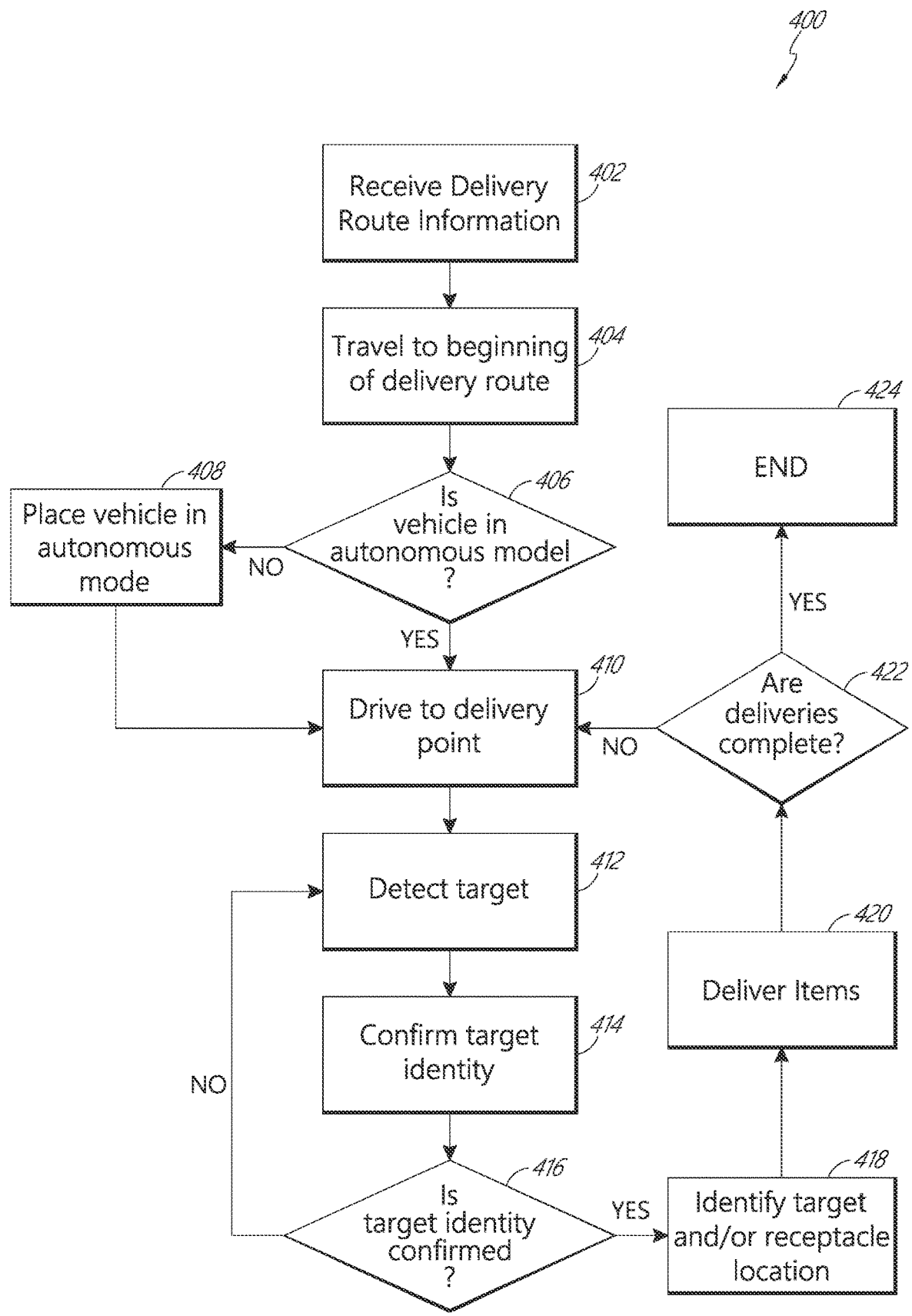
FIG. 4 is a flow chart illustrating an embodiment of a process for delivering an item using an autonomous vehicle.

FIG. 4 is an embodiment of a process for delivering an item using an autonomous vehicle. Process 400 begins in block 402, wherein delivery route information is identified. Delivery route information can include a delivery route identifier, the coordinates of delivery points assigned to a delivery route, unique identifiers associated with targets 230 located at delivery points assigned to a delivery route, and carrier identification. In some embodiments, delivery route information can be received at the vehicle 200 by an operator, such as a delivery resource, inputting a route identification number into the vehicle interface 215. In some embodiments, delivery route information can be received in the vehicle 200 via an operator, such as a delivery resource, logging into a mobile delivery device 360, and pairing the mobile delivery device 360 with the vehicle 200. For example, a carrier may be assigned to a particular delivery route. This assignment can be a standard assignment stored in the database 346, onboard the vehicle 200, or it can be established by a supervisor or other user via the user input device 350. A carrier logs in to a mobile delivery device 360, and/or into the vehicle computer, with unique credentials that are recognized by the server 340. The server 340 accesses the carrier information in the database 346 and determines which delivery route is assigned to the carrier who logged in to the mobile delivery device 360. The delivery route information can be downloaded or transmitted to the central computer 201 via the communication device 203 or to the mobile delivery device 360, and stored there for transmission to the vehicle 200. In some embodiments, the mobile delivery device 360 is paired, such as via a Bluetooth connection, with the vehicle 200. When the pairing is accomplished, the mobile delivery device 360 can transmit the delivery route information to the central computer 201 of the vehicle 200.

In some embodiments, the mobile delivery device 360 can be paired or connected to the vehicle 200, such as being in a dock in the vehicle, before a carrier logs in. The carrier can then log in and either identify a delivery route, or a delivery route will be automatically identified based on the login information and information stored in the database 346.

After the delivery route is identified, further delivery route information can be transmitted or communicated to the vehicle 200, stored in the mobile delivery device 360, or both. In some embodiments, coordinate data, such as GPS coordinate data, for each delivery point assigned to the delivery route is received in the vehicle 200 and/or the mobile delivery device 360. In some embodiments, unique identifiers for the targets 230 associated with the delivery points assigned to the delivery route can be received in the vehicle 200 and/or the mobile delivery device 360. The unique identifiers for the targets 230 are stored for use later when identifying targets at the delivery points along the delivery route.

After the delivery route information is received, the process 400 moves to block 404, wherein the vehicle 200 travels to the beginning of the delivery route. The beginning of the delivery route can be stored in the central computer 201 as GPS coordinates or other types of geospatial coordinates. After the first delivery point is identified, the vehicle 200 can drive in autonomous mode to the GPS coordinates corresponding to the beginning of the route using signals and input received in the location sensor 202. In some embodiments, the carrier may drive the vehicle to the beginning of the delivery route. The beginning of the delivery route may correspond to the first delivery point along the delivery route, or it may be a location in the vicinity of the first delivery point, such as at a street corner, intersection, etc. adjacent the first delivery point.

The process 400 moves to decision state 406, wherein it is determined whether the vehicle 200 is in autonomous mode. If the vehicle 200 is not in autonomous mode, the process 400 moves to block 408, wherein the vehicle 200 is placed in autonomous mode. The vehicle 200 can place itself in autonomous mode when the vehicle 200, using the sensors, including a location sensor 202, identifies that the vehicle is within a predetermined distance from the first delivery point. In some embodiments, the vehicle 200 enters autonomous mode when it comes within a geofence or predefined geographical area around the first delivery point. In some embodiments, the carrier can place the vehicle 200 in autonomous mode using the vehicle interface 215 or the mobile delivery device 360.

When the vehicle 200 is in autonomous mode, the process 400 moves to block 410, wherein the vehicle drives to the first delivery point on the delivery route assigned or identified to the vehicle 200. In some embodiments, the central computer 201 of the vehicle 200 has received the address, or coordinates, such as GPS coordinates of each delivery point along the delivery route in block 402. However, in some embodiments, the vehicle 200 can be in wireless communication with the server 340, and receive delivery point information as the vehicle 200 is along a delivery route. For example, the server 340 may transmit to the vehicle 200 the delivery point information, such as address, coordinates, etc., to the vehicle for a first delivery point on delivery route. After delivering items, the vehicle 200 may send a signal to the server 340 confirming the delivery is complete. The server 340 may then communicate the information for the next delivery point, to the vehicle 200, and the vehicle 200 can proceed to the next point. In some embodiments, the server 340 can override the delivery route information provided in block 402, and send alternate instructions to the vehicle 200 to proceed to a different delivery point than the scheduled delivery point. This can happen in the case of a priority item delivery, where an item needs to be delivered at a certain time or within a certain time frame. In some embodiments, the vehicle interface 215 can display the address, name, or other information about the upcoming delivery point so the carrier can see the information. If the server 340 overrides a delivery point, the vehicle interface 215 can display an alert for the carrier.

As the vehicle 200 travels to the delivery point, the vehicle uses its location identified by the location sensor 102 and other sensors described herein. As the vehicle 200 is traveling, the carrier can stage, prepare, sort, identify, or otherwise prepare the items for delivery at the upcoming delivery point. In some embodiments, the carrier does not ride in the vehicle 200 as it moves between each delivery point, but may walk alongside the vehicle 200, taking the items intended for delivery at one or more delivery points at a time. When the vehicle 200 comes within a certain distance of the delivery point, such as determined by GPS coordinates, or comes within a predetermined geofence around the delivery point, the process 400 proceeds to block 412 wherein the target 270 is detected.

To detect the target 270, the target sensor 210 emits a signal, scans for computer readable codes, or otherwise interrogates the vehicle's surroundings to identify a target. For example, the target sensor 210 can emit a LIDAR signal, such as laser light in a field around the vehicle 200. The target sensor 210 senses the reflected LIDAR signals and interprets the reflected signals. The target sensor 210 can recognize a reflected LIDAR signals and identify any known reflection patterns or signals to determine whether a target 270 has been detected. In some embodiments, the target sensor 210 begins to detect the target 270 when the vehicle 200 moves within the geofence of delivery point, or when the vehicle 200 determines it is at the GPS coordinates of the delivery point. In some embodiments, the target sensor 210 is continuously, or periodically emitting signals.

In some embodiments, detecting the target 270 includes scanning a field of view by the video camera 206 to identify computer readable codes, or by scanning the area using the radar and/or ultrasonic detectors 207, 208 to detect a target 270.

The process 400 next moves to block 414, wherein the identity of the target 270 is confirmed. Confirming the identity of the target 270 comprises uniquely identifying a target 270 as belonging to a particular delivery point, a delivery route, a delivery carrier, and the like. In some embodiments, the target sensor 210 may detect objects or receive signals from objects other than an intended target 270. In such circumstances, the target sensor 210 and the central computer 201 can confirm the identity of a target 270 as being the target 270 associated with a delivery point, with the delivery carrier, with a delivery route, and the like. In some embodiments, the vehicle 200 will not drive itself to a target 270 which has an incorrect identifier, or which cannot be confirmed.

The central computer 201 and/or the database 340 can store or access a list of identifiers for targets 270 along a specified delivery route. As the vehicle 200 travels along the delivery route and detects a target 270, the target 270 can return a signal to the target sensor 210, which the central computer 201 can interpret and use to positively identify the target 270. The central computer 201 can perform this verification onboard the vehicle, and/or by transmitting the identifier to the server 340 via the mobile delivery device or directly to the server 340, and receiving a confirmation signal from the server that the identifier is associated with the delivery point, or is a valid target 270 for the delivery route. The server 340 can query the database 346 to confirm the identifier, and report confirmation to the server 340, which, in turn, can report confirmation to the vehicle 200.

In some embodiments, the target 270 has a unique identifier encoded therein or thereon, such that when interrogated by a LIDAR signal from the target sensor 210, a specific signal is returned. The specific signal for the target 270 may have been stored previously in the database 346 or onboard the vehicle 200 in the central computer 201. In some embodiments, the target is a passive RFID tag which emits a signal when interrogated by a signal from the target sensor 210. In some embodiments, the target 270 is an active RFID tag which emits an identifier signal at regular or programmed intervals, intermittently, in response to a signal from the target sensor 210, or continuously.

In some embodiments, the target 270 has a computer readable code thereon, which can be read by the video camera 106 and decoded by the central computer 201 or the server 340. In some embodiments, the target 270 returns a specific signal when interrogated by a signal from the target sensor 210.

In order to confirm the identity of the target 270, the identifier which is encoded, stored in, emitted by, or printed on the target 270 should be known to one or more components of the network 300. The identifiers of the targets 270 along a delivery route can be obtained and stored prior to the delivery of items. The vehicle 200 can drive along the delivery route with a carrier to obtain the identifiers. As the vehicle 200 approaches a delivery point, the carrier can scan a target 270 using the mobile delivery device 360, and communicate the received identifier to the vehicle 200 and to the network 300. In some embodiments, the vehicle can identify targets 270 using the target sensor 210, which the carrier can confirm using the vehicle interface 215. When an identifier for a target 270 is confirmed, the central computer 201 and/or the network 300 stores the identifier for use in delivery entity, the carrier, and the like, such as the USPS, place the targets 270 on the containers 260. In this way, the network 300 knows the identifiers encoded, embedded, printed in, etc. to the targets 270 when they are placed, and can associate specific targets 270 with specific delivery points. In some embodiments, the targets 270 are not specific to the delivery points, but are specific to a delivery route. In some embodiments, the targets 270 only generally identify targets as being associated with the delivery carrier, such as with the USPS, and do not specifically identify a delivery point.

In some embodiments, a resident, occupant, individual, business or the like can buy, obtain, install, or provide a receptacle 250 having a target 270 thereon or attached thereto. The resident or occupant can register the target 270 with the network 300 via the user input device 350, so that the target 270 will be recognizable to the target sensor 210. The resident or occupant can input the delivery point, such as an address, along with a serial number listed on the target 270, a computer readable code on the target 270, or other input from the target 270 into the user input device 350. This can be done, for example, via a smart phone a mobile application, or a website, such as the USPS's website. The user input device 350 communicates the information input from the target 270 to the server 340, where it can be stored and associated with the input delivery point.

The process moves to decision state 416, wherein the central computer 201 determines whether the target 270 has been confirmed. If the identity of a target 270 is confirmed, the process 400 moves to block 418, wherein the vehicle identifies the location of the target 270 or receptacle 250. When the central computer 201 confirms the identity of the target 270, the central computer 201 can cause the identification of the delivery point to display on the vehicle interface 215 or on the mobile delivery device 360, or both. For example, the central computer 201 can display the address of the delivery point, the name of a resident or occupant, the name of the commercial enterprise or business, or other information regarding the delivery point. The carrier can view the delivery point identification in order to know which items should be prepared for delivery at the identified delivery point, so they can be sorted, prepared, etc. as the vehicle 200 moves to the receptacle 200. In some embodiments, the vehicle interface 215 may include a confirmation request. The carrier can confirm that the displayed delivery point is the next delivery point and press a button, input via touch screen, voice command, and the like. The vehicle 200 may wait to move to align or position the vehicle 200 at the receptacle 200 for the delivery point until confirmation is received.

If the identity of the target 270 is not confirmed, process returns to block 312, wherein the central computer 201 attempts to detect another target in the vicinity. If no target 270 can be found, the vehicle alerts the carrier via the mobile delivery device 360 or the vehicle device 215, and proceeds to the coordinates of the next delivery point on the delivery route.

In block 416, the vehicle 200 identifies the target 270 for a delivery point. To detect the target 270, the target sensor 210 can be activated when the vehicle 200 arrives at the coordinates of the delivery point. The target sensor 210 can send out interrogation signals, LIDAR signals, radar signals, and the like. The target sensor 210 can also receive corresponding signals reflected or initiated by the signals sent from the target sensor. In some embodiments, the ultrasonic sensor 107, the radar sensor 108, the video camera 108 can identify the target 270 based on a specific reflected sound or radar signal, or by recognizing a specific pattern, image, or computer readable code on the target 270.

When a target is identified by the target sensor 210, the process 400 moves to block 414, wherein the location of the target 270 is identified. Identifying the location of the target 270 and/or the receptacle comprises identifying the physical location of the target 270, and of the container 260, and comprises identifying the location of the vehicle 200 in relation to the target 270. Identifying the target 270 and/or the receptacle 250 location in relation to the vehicle 200 allows the vehicle 200, guided by the sensors and the central computer 201, to automatically align itself with the container 260, so the carrier can deposit items into the container 260.

For example, the vehicle 200 drives automatically to a delivery point according to stored or identified GPS coordinates of the delivery point. However, in some embodiments, a location sensor 102, such as a GPS module, can be accurate within a predetermined distance such as 1 foot, 2 feet, 3 feet, 5 feet, 10 feet, 20 feet, 50 feet, 100 feet, or more. This level of accuracy may not be sufficient to ensure the vehicle is located at the receptacle 250 for the delivery point. To ensure the vehicle 200 is aligned with the receptacle 250 or the container 260 into which the items are to be deposited, the vehicle 200 must identify the exact location of the target 270 and/or the receptacle 250 in order to position the vehicle 200 properly.

In some embodiments, the target sensor 210 uses a near field communication, such as a passive or active RFID signal to determine exactly where the vehicle 200 needs to move to align with the target 270. The target sensor 210 can send out a signal that is reflected by the target, or which is absorbed or received by the target 270 and the target broadcasts a signal in response, or both. Using the reflected or broadcast signal from the target 270, the central computer 201 can determine the distance and direction of the target 270 in relation to the vehicle 200. In some embodiments the vehicle, once the target 270 has been identified, continuously, periodically, or intermediately sends signals to and receives signals from the target 270, as the vehicle 200 moves. Based on the continuous, periodic, or intermittent signals, the central computer 201 determines how the distance and direction to the target 270 are changing, and can instruct the vehicle 200 to move proximate to and align with the sensor.

In some embodiments, the target sensor 210 or the video camera 106 can be a stereo camera which detects the target 270, which can be an image, computer readable code, or unique identifier to determine the vehicle 200's position with regard to the target 270. The stereo camera can alone or in conjunction with signals from the ultrasonic sensor 107 and/or the radar sensor 108, determine the distance and direction of the target 270, and the vehicle 200 can move to the target 270 accordingly.

In some embodiments, the target 270 is an active RFID tag, which sends instructions in response to a signal from the target sensor 210, or which broadcasts a signal at a certain periodicity, or continuously. The signal from the active RFID target 270 can communicate specific instructions to the vehicle 200. For example, the target 270 may not be physically affixed to or attached to the container 260 of the receptacle 250. The target may be on a street sign, a sidewalk, a fence, or other position near the container 260. In this case, the target 270 may tell the vehicle that the container 260 is, for example, two feet forward from the location of the target 270. The central computer 201 can then determine, from this signal, exactly how far to move the vehicle 200 to align with the receptacle 250.

In some embodiments, the exact position of the target 270 and/or the container 260 can be determined in advance of the carrier proceeding on the delivery route. This can be accomplished by driving a vehicle along the delivery route to be mapped so the central computer 201 can learn the contours, features, and the exact locations of the receptacles 250 along the delivery route. The target sensor 210, the video camera 106, the ultrasonic sensors 107 and the radar sensors 108, can create an electronic map or virtual map of the delivery route, including the location of the target 270. The map can identify targets 230 and identify the distance between the target 270 and landmarks, terrain, environmental features, and the like. For example, a target 270 may be affixed to a container 260 at a receptacle, such as a mailbox. The mailbox can be located near a tree, a flag pole, a reflective house number painted on the sidewalk, etc. The target sensor 210, the video camera 106, the ultrasonic sensors 107 and the radar sensors 108, will identify these landmarks and environmental features and calculate a distance between the landmarks and environmental features and the target 270, and/or the receptacle 250.

These distances will be stored by the central computer 201 and may be transmitted to the server 340. As the vehicle 200 moves along the delivery route subsequent to creating the map, the target sensor 210, the video camera 106, the ultrasonic sensors 107 and the radar sensors 108, can identify and locate the landmarks and environmental features and, using the stored virtual or electronic map, the central computer 201, based on the sensor input, can determine the distance from the vehicle 200 to the target 270, or to the receptacle 250. The vehicle can then move the appropriate distance determined by the central computer 201 to align the vehicle 200 with the target 270 or the receptacle 250.

The type of vehicle 200 can affect where the vehicle 200 must be positioned to be aligned with the container 260 of the receptacle 250. For example, a small vehicle may have a window positioned near the front of the vehicle through which the carrier can reach to place items in the container 260. A truck may have a window nearer the center of the vehicle, or farther back from the front of the vehicle as compared to the smaller vehicle. The central computer 201 recognizes the vehicle type, and incorporates the vehicle type when positioning the vehicle 200 at the container 260.

When the vehicle 200 is positioned at or aligned with the container 260 of the receptacle 200, the carrier places the items intended for delivery to that delivery point in the container 260. In some embodiments, the vehicle 200 stops at the receptacle 200 while the carrier delivers the items. In some embodiments, the carrier provides an input on the vehicle interface 215 that the item delivery is complete, and the vehicle 200 can move to the next delivery point. Further details about the process of the vehicle 200 stopping at a delivery point and proceeding to the next delivery point will be described below with reference to FIG. 6.

After item delivery is complete to a delivery point, the process 400 moves to decision state 422, wherein it is determined if there are additional delivery points remaining on the delivery route. If there are, process 400 returns to block 410. To make the determination whether there are delivery points remaining on the delivery route, the central computer 201 can track the progress of the vehicle 200 and deliveries to the delivery points as the vehicle 200 moves along the delivery route. If, at the completion of delivery to one delivery point, additional delivery points remain on the delivery route, the central computer 201 causes the vehicle to move to the next delivery point as described in block 410.

In some embodiments, after completing a delivery, the carrier can confirm to the central computer 201 that the deliveries are complete via the mobile delivery device 360. The carrier can have the option to instruct the vehicle 200 to proceed to the next delivery point along the delivery route from the mobile delivery device 360, while the carrier walks to the next delivery point. The vehicle 200 can function as a mobile storage facility or mobile sorting facility. The carrier can take the items for one, two, three, or more delivery points when the carrier exits the vehicle 200, and can instruct the vehicle 200 to move along the delivery route as necessary. In some embodiments, the carrier can exit and reenter the vehicle 200 at each delivery point. In some embodiments, the carrier can walk along the delivery route delivering items, such as flats, envelopes, and the like, and the vehicle 200 can move along with the carrier, as the vehicle 200 detects the movement of the mobile delivery device 360 the carrier is holding, using, and/or carrying. In some embodiments, the carrier can walk along the delivery route as the vehicle 200 moves to follow the mobile delivery device 360 position, or as instructed by the carrier from the mobile delivery device 360. In some embodiments, the carrier can scan, interrogate, read, or otherwise interact with a target 270 using the mobile delivery device 360 as the carrier is not in the vehicle 200. The mobile delivery device 360 sends information from the target 270 to the central computer 201 of the vehicle 200. The central computer 201 interprets the information from the target 270 and identifies the delivery point with which the target 270 is associated, and instructs the vehicle 200 to travel to the delivery point identified.

In some embodiments, as the carrier walks along the delivery route carrying smaller items such as flats, envelopes, mail, and the like, the mobile delivery device 360 can alert the carrier that a bulky item, such as a package or parcel, is in the vehicle 200 and is intended for delivery to an upcoming delivery point, prompting the carrier to return to the vehicle 200 to retrieve the bulky item for delivery to the container 260.

If there are no more delivery points on the delivery route, the process 400 ends in block 424, and the vehicle 200 automatically drives or the carrier drives the vehicle 200 back to the delivery facility.

Figure 5:
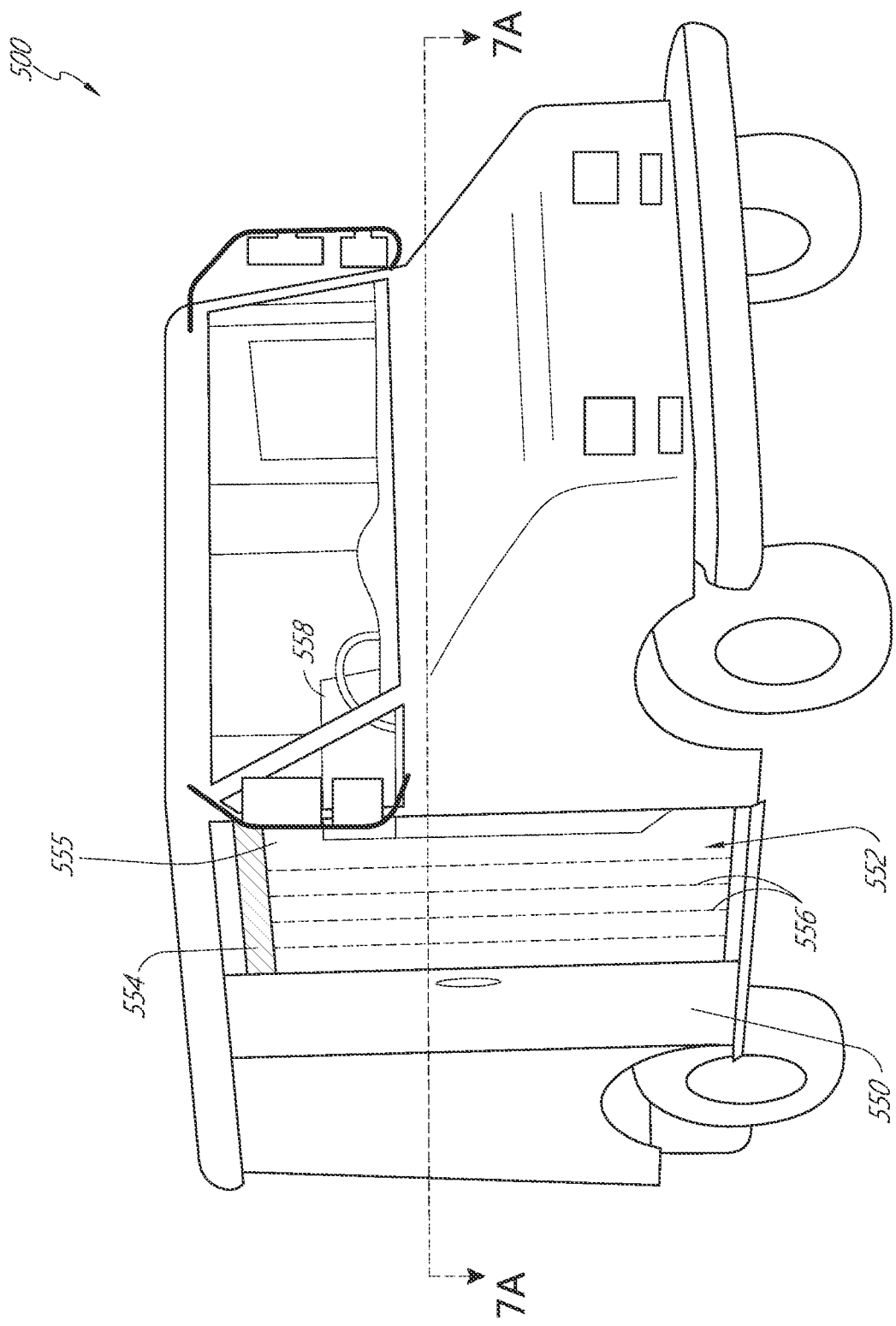
FIG. 5 depicts a perspective view of an embodiment of an autonomous vehicle for delivering items.

FIG. 5 depicts an embodiment of a semi-autonomous vehicle for delivering items. A vehicle 500 is adapted to carry items for delivery, and can have similar sensors, detectors, and the like similar to vehicles described elsewhere herein. The vehicle 500 comprises a door 550 formed in the side (as shown) or rear of the vehicle, which is operable to allow access to a compartment within the vehicle. The compartment may be a passenger compartment, driver compartment, and/or a cargo compartment. The door 550 is operable to allow a carrier to enter and exit the vehicle 550. In some embodiments, the door 550 is sized to allow a portion of the carrier's body, such as an arm, to extend from the compartment out of the vehicle 500 in order to deposit items in a receptacle at a delivery point. The door 550 covers an opening 552, such that as the door 550 is open, the opening 552 is exposed or available for passage therethrough. In some embodiments, the door 550 comprises an openable window through which the carrier can extend an arm. In some embodiments, an automated arm (not shown), such as a robotic arm, can extend from the compartment of the vehicle 500 through the door 550 to automatically deposit items in a receptacle.

The vehicle 500 comprises a presence sensor 554 attached to a frame 555 of the door 550 near the opening 552. In some embodiments, the presence sensor 554 is attached to the vehicle at a point near the opening 552 of the door such that the presence sensor 554 can emit signals into the opening 552 and/or sense signals from opening 552. The presence sensor 554 emits a signal 556 and can detect when an object passes through the opening 552. The can be a motion detector, an infrared sensor, an optoelectronic device such as a light curtain, an ultrasonic detector, and the like. The presence sensor 554 is configured to detect when an object is within its sensor field, so as to determine whether an object has passed through the opening 552. In some embodiments, the presence sensor 554 is positioned above the opening 552 or along a side of the opening 552 to project or create a sensor field of signal 556 in direction parallel to the opening 552, such as in a plane parallel to the door 554 and/or the opening 552. In this way, when the carrier exits the vehicle 500 or extends an arm through the opening 552, the presence sensor 552 detects the presence and sends a signal to the central computer 201 regarding the sensed presence. The central computer 201 is configured to record an interruption in the signal 556, or a detected presence, and to record a time of interruption or presence. The presence sensor 554 can include a plurality of presence sensors 554 which are collocated or aligned to create a plane or sensor field, with each individual sensor configured to detect presence or interruption in the signal 556.

The presence sensor 554 is in communication with a central computer 201 of the vehicle 500 and communicates the presence of an object, or a break in the signal 556 to the central computer 201. The central computer 201 interprets information from the presence sensor 554 and with internal logic or programming determines whether the signals are indicative of carrier ingress, egress, or other activity through the opening 552.

The vehicle 500 further comprises a seat 558 for the carrier or delivery resource to sit on, stage articles on, and the like while in the vehicle. The seat 558 can comprise a seat sensor (not shown) configured to detect whether the carrier is on the seat, such as a pressure or weight sensor similar to those described elsewhere herein.

Figure 6:
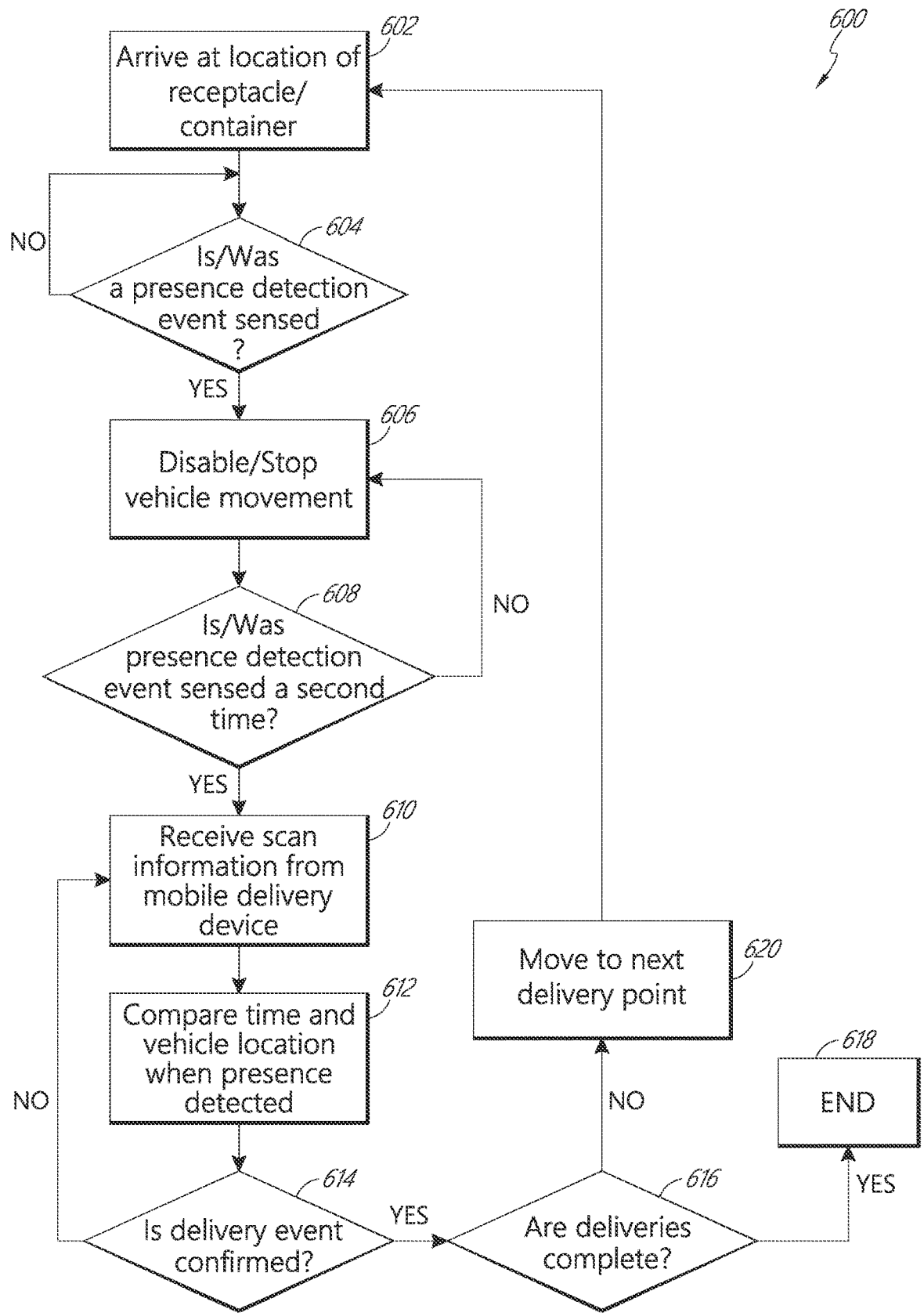
FIG. 6 is a flowchart depicting an embodiment of a method of item delivery using an vehicle having a presence sensor.

FIG. 6 is a flowchart depicting an embodiment of a method of item delivery using a vehicle 500 having a presence sensor 554. A process 600 begins in block 602, wherein the vehicle 500 is moves to a delivery point and the location of the receptacle 250, as described with regard to block 418 of FIG. 4. The vehicle 600 may come to a stop at the location of the receptacle 250 so that the carrier can exit the vehicle or extend an arm through a window to deposit the items to be delivered in the container 260.

The process 600 next moves to decision state 604, wherein the presence sensor 554 determines whether a presence has been detected by the presence sensor 554. The presence sensor 554 can detect when an object enters the presence sensor space. If the presence sensor 554 detects a presence, which can last for a brief duration, such as if a carrier exited the vehicle 500 through the opening 552, the carrier will briefly interrupt the signal 556, and be detected by the presence sensor 554. Once the carrier is clear of the opening 552, the signal 556 will no longer be interrupted, and the presence sensor 554 will not detect a presence. However, the interruption in the signal 556 and the presence will be recorded in the central computer 201 as an event. The interruption in the signal can also be of a protracted duration, such as if a body part or robotic arm, or other object were maintained within the sensor field, or within the opening 552 for a prolonged period of time. In some embodiments, the presence sensor 554 sends an initial signal to the central computer 201 when the presence is initially sensed, and sends another signal to the central computer 201 when the presence is no longer sensed. In some embodiments, the central computer 201 periodically or continuously monitors the status of the presence sensor 554, and records at intervals whether the presence sensor 554 is detecting a presence, or whether no presence is sensed.

If the presence sensor 554 detects or has detected a presence, the process 600 moves to block 606, wherein the vehicle 500 stops movement, or movement is disabled. For example, the central computer 201, upon receiving a signal from the presence sensor 554 detects a presence, the central computer 201 will not allow the vehicle 500 to move, or will disengage movement, stop the engine, or otherwise prevent movement of the vehicle 500. Disabling movement of the vehicle 500 will ensure the vehicle 500 does not advance to the next delivery point without the carrier being present in the vehicle, will increase carrier safety by ensuring the vehicle 500 does not move while the carrier is out of the vehicle 500 and is, for example, walking around the vehicle, accessing a cargo compartment to obtain a parcel, package, or other item, or is actively egressing the vehicle 500.

The process 600 next moves to decision state 608, wherein the presence sensor 554 determines whether a presence has been detected after the carrier has egressed the vehicle, or after the initial presence was detected. If no second presence is detected, or if the signal 556 is not interrupted a second time after decision state 604, the process returns to block 606, wherein the vehicle 500 is maintained in a non-driving state, and the process 600 waits until a second presence is detected.

If a second interruption in the signal 556 is detected, or a second instance of detecting a presence occurs, the presence sensor 554 communicates to the central computer 201 that a second presence has been detected, and the central computer 201 records the event and the time of the event. The process 600 moves to block 610, wherein the central computer 201 determines whether a scan event was recorded from the mobile delivery device 360, as would occur as the carrier scans an item during delivery, or scans an item as it is deposited into the container, on a porch, at a delivery point, or otherwise delivers the item to the receptacle 250.

The process 600 moves to block 612, wherein the central computer 201 compares the times of the presence detection events and the location of the vehicle 500 during the presence detection events. For example, each time the presence sensor 554 detects a presence, the central computer 201 can also record the vehicle position using input from the sensors described herein, including a GPS position sensor, an odometer sensor, LIDAR, ultrasonic sensors, radar sensors, and the like.

In some embodiments, as described above, the carrier may not wish to reenter the vehicle 500 before travelling to the next delivery point, such as when the carrier is walking along the route, and the vehicle 500 is functioning as a mobile container, or if the carrier sees that it is simpler, quicker, etc. to walk to the next delivery point rather than returning to the vehicle. In such a case, as described above, the carrier can provide an input to the mobile delivery device 360 to instruct the vehicle 500 to move to the next delivery point.

The process 600 then moves to decision state 614 wherein a delivery event is confirmed. Using information received in block 610, if the central computer 201 determines that a scan event was received from the mobile delivery device 360 at a time between the first presence detection and the second presence detection, the central computer 201 determines that the first presence detection corresponds to a carrier egress through the opening 552, and the second presence detection event corresponds to a carrier ingress into the vehicle following completion of delivery to the delivery point. The central computer 201 confirms that a delivery event has occurred at a delivery point.

Referring to information obtained in block 612, the central computer 201 can use the time of the presence detection events and the vehicle location to interpret the presence events and to confirm a delivery has occurred. For example, two presence detection events that occur within a very brief time period, such as half a second, 1 second, 2 seconds, 5 seconds, or any other desired time period may be interpreted as not a delivery event, as sufficient time has not elapsed between presence detections for a carrier to have made a delivery. The central computer 201 can set a threshold value of, for example, 1 second, 2 seconds, 5 seconds, or any other desired time period for this determination. If the time between presence detection events is longer, for example, 15 seconds, 30 seconds, 1 minute, or any other desired time period, the central computer 201 can determine that sufficient time has elapsed between presence detection events to indicate the carrier has completed a delivery to the receptacle 250.

In some embodiments, the central computer 201 also determines what the position of the vehicle 500 is at each presence detection event. If the position of the vehicle 500 for two sequential presence detection events is the same, then the central computer 201 can interpret the presence detection events as an egress and ingress, and can determine that a delivery has occurred. If the position of the vehicle 500 for two sequential presence detection events is not the same, the central computer 201 determines that the presence detection events do not constitute a delivery event.

The central computer 201 can make a determination of a delivery event, such as a carrier egress and ingress based on presence detection event time, vehicle 500 location during presence detection event, whether a scan event occurred between presence detection events, or on a combination of any or all of these events. In some embodiments, block 610 may be omitted from the process, or block 612 may be omitted from the process. For example, when a scan event is determined to have occurred between the presence detection events, then the central computer 201 may not need to determine or use the vehicle 500 location information to determine whether a scan event has occurred.

In some embodiments, a carrier may not have an item for delivery which is scanned using the mobile delivery device 360, and thus, no scan information from the mobile delivery device 360 is received. In this case, if no scan event is received from the mobile delivery device, the central computer 201 makes a determination regarding occurrence of a delivery event without a scan event signal. Thus, in some embodiments, the process 600 may omit block 610.

If a delivery event is not confirmed, the process 600 returns to block 610. If a delivery event is confirmed, the process 600 moves to decision state, wherein it is determined if deliveries are complete for the delivery route assigned to the vehicle 500 and the carrier. If no additional delivery points are left along the delivery route, the process 600 moves to block 618, wherein the process ends.

If there are additional deliveries to be made on the delivery route, the process 600 moves to block 620, wherein the vehicle 500 moves to the next delivery point. In some embodiments, moving to the next delivery point can include receiving a confirmation from the carrier via the user interface 215 that the carrier is ready to move to the next delivery point. For example, the carrier may press a button, tap a touch-screen interface, press on the brake or gas pedal, use a voice command, or otherwise provide an input to the central computer 201 indicating the carrier is ready for the vehicle 500 to proceed to the next delivery point. In some embodiments, the seat 558 may contain a sensor to detect whether the carrier is sitting in the seat 558. The seat sensor can detect when the carrier sits down in the seat and supply this signal to the central computer 201. When the central computer 201 has determined that a delivery event has occurred as in decision state 614, and when the seat sensor indicates the carrier is in the seat, and therefore, in the vehicle, the vehicle 500 can move to the next delivery point.

In some embodiments, the carrier can instruct the vehicle 500 to move forward by drawing a pattern in the light curtain to signal to the vehicle 500 that the carrier is on board and ready to move to the next delivery point. For example, the carrier can pass an arm from the rear of the opening 552 toward the front of the opening 552, or from high in the opening 552 to low in the opening 552, to trigger individual sensors of a plurality of presence sensors 554. The sequential detection of a presence by the plurality of presence sensors can be interpreted as an instruction to the central computer 201 to move the vehicle 500.

In some embodiments, the central computer 201 can move the vehicle to the next delivery point after a predetermined wait time after the carrier re-enters the vehicle. For example, after the central computer 201 has determined a delivery event has occurred following a second presence detection event, the central computer 201 may wait a predetermined time, such as 5 seconds, 10 seconds, 15 seconds, or any other desired time, to allow a carrier to be seated or to prepare for the vehicle 500 to drive to the next delivery point.

In some embodiments, the central computer 201 displays on the vehicle interface 215 a notice to the carrier that the vehicle is going to begin moving to the next delivery point. The notice can be a text warning, a light, a countdown timer, an audible signal, or any other desired indication. After displaying the communication of imminent vehicle movement, the vehicle 500 begins moving to the next delivery point, which can be located as described above with regard to FIG. 4.

The process 600 returns to block 602, wherein the process repeats for the next delivery point.

The vehicle 200 can include the standard equipment to allow a carrier to drive the vehicle 200, including acceleration and brake pedals, a steering wheel, transmission controller, and the like. These components can take up room within the vehicle's compartment. With the vehicle in autonomous driving mode, the driving components, e.g., accelerator and brake pedals, steering wheel, etc., need not be available to the carrier or vehicle operator. To increase the amount of space available to a carrier for sorting items, staging items for delivery to an upcoming delivery point or group of delivery points, the pedals, steering wheel, transmission controller, can be adapted to fold up, articulate to a different location, stow into the vehicle 200, or otherwise be moved to open more space in the vehicle 200's driver compartment.

Figures 7A, 7B:
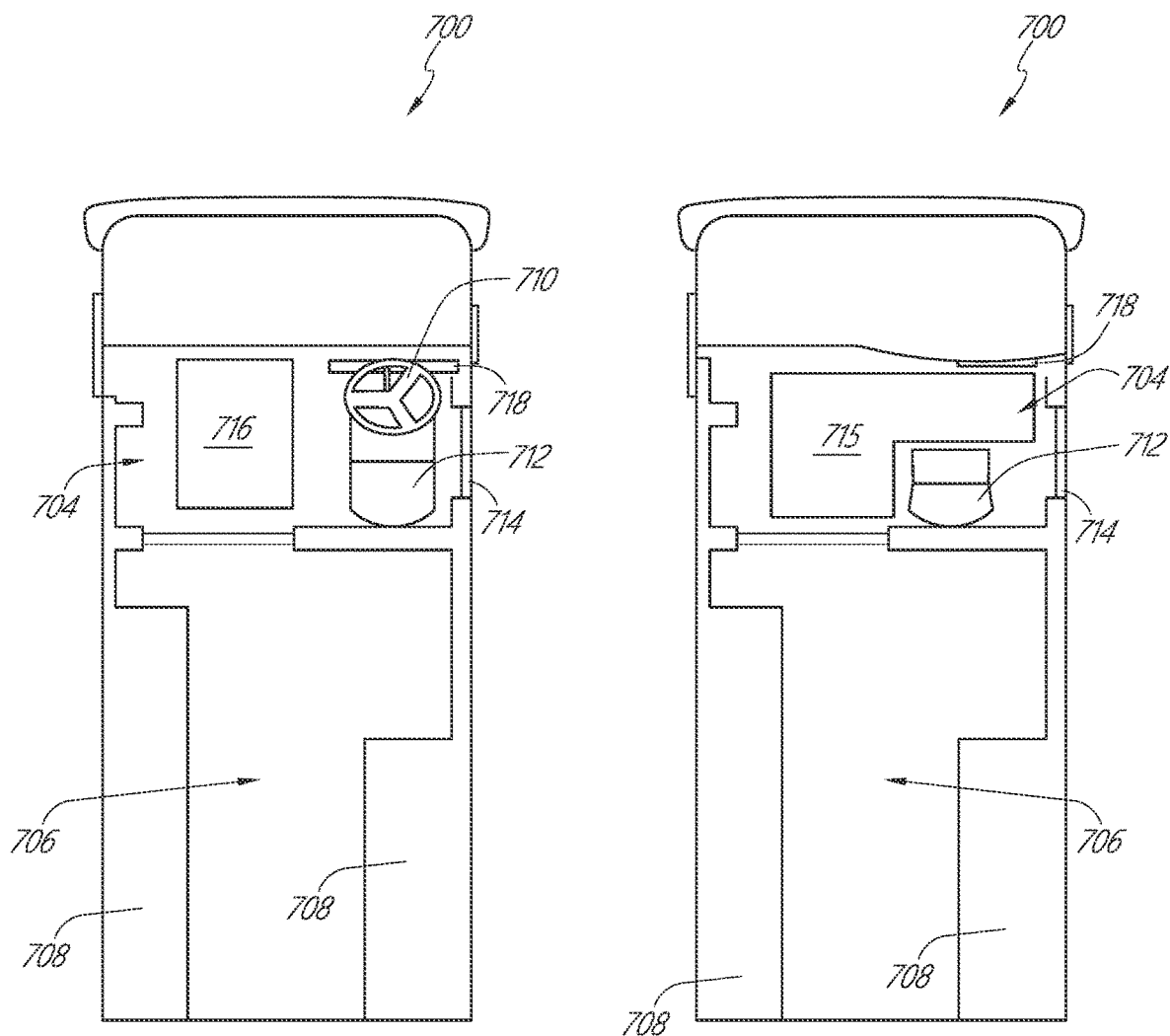
FIG. 7A depicts a top cutaway view of an embodiment of an autonomous delivery vehicle a standard configuration, taken along line 7A-7A of FIG. 5.
FIG. 7B depicts a top cutaway view of an embodiment of an autonomous delivery vehicle in a modified configuration, taken along line 7A-7A of FIG. 5.

FIG. 7A depicts a top cutaway view of an embodiment of a delivery vehicle a standard configuration taken along line 7A-7A of FIG. 5. A delivery vehicle 700 in includes a driver compartment 704 and a cargo compartment 706. The driver compartment 704 includes a steering wheel 710, a chair 712, a door 714, an open area 716, and a dashboard 718. The positioning of the steering wheel 710 and chair 712 leave only a small open area 716 in which the carrier can sort or stage items for delivery. The steering wheel 710 and the chair 712 also impede easy movement between the cargo compartment 706 and the door 714.

FIG. 7B depicts a top cutaway view of an embodiment of a delivery vehicle in a modified configuration. In the modified configuration the steering wheel 710 has been folded or stowed into the dashboard 718, and the chair 712 has been reconfigured to be a shelf or platform, or has been reconfigured to receive a shelf or platform for sorting and staging items thereon. The modified configuration provides a larger open area 715, and allows a carrier or delivery resource to move about the driver compartment 704, and move between the cargo compartment 706 and through the door 714 with more freedom, with the steering wheel 710 and the chair 712 moved out of the way. Within the larger open area 715, the carrier can prepare, stage, sort, or otherwise prepare items for delivery to one or more upcoming delivery points as the vehicle 700 moves autonomously to a delivery point, or between delivery points.

FIG. 8 depicts a chart of an embodiment of vehicle and carrier routes. A vehicle 800, which can be similar to those described elsewhere herein, can be an autonomous replenishment vehicle. The vehicle 800 can act as a mobile warehouse or replenishment vehicle for resupplying carriers along their routes at predetermined locations.

FIG. 8 shows an example using three carriers, C1, C2, and C3. Each carrier is assigned a route. As depicted, carrier C1 is assigned a route 801, carrier C2 is assigned a route 820, and carrier C3 is assigned a route 830. The routes 810, 820, and 830 can be standard routes, or can be dynamically generated based on item volume, carrier availability, and the like. Each route includes segments. For example, on route 810, a first segment 812 begins at stop C1S1 and goes to stop C1S2. The segments 812, 814, and 816 can have a plurality of delivery points therein. Segments 822, 824, 826, 832, 832, and 836 can be arranged similarly.

For example, as carrier C1 begins a route at stop C1S1, the first segment 812 can have 100 delivery points, or any other desired delivery points, which can be arranged in a walking order, or in any desired pattern. The carrier C1 departs the vehicle 800, or a delivery unit 850 with the items for delivery along the segment 812. In some embodiments, the segments can be dynamically allocated within the routes 810, 820, and 830 depending on item volume for a particular route. In some embodiments, a route can be divided into 2, 3, 4, 5, or more segments, with each segment having the same or about the number of items for delivery along each segment. If there are a large number of items, or if there are large items, such as parcels that a carrier C1 could not carry, then the route 810 is divided into more segments. In some embodiments, where a large, difficult to carry item is intended for delivery to a particular location, that delivery location can be set as the designated stop C1S2, C1S3, C2S2, etc. This allows the large item to be delivered from the vehicle 800 to the delivery point without the carrier C1 needing to carry the item along the route 810. The route segment determination also takes into account the time the vehicle takes to travel between replenishment stops. As shown in FIG. 8, route 810 is divided into the three segments 812, 814, and 816. In some embodiments, the route 810 can be divided into segments 812, 814, and 816 according to other factors, other than, or in addition to item volume, such as carrier identity, route travel distance, route traversal time, or any other desired criteria. The routes 810, 820, and 830 are divided into segments having designated stops associated therewith. For example, the segments 812, 814, and 816 each begin with a stop C1S1, C1S2, and C1S3 respectively.

The carrier C1 departs the delivery unit 850 at set time, for example, 8:00 AM. The carrier C1 leaves the delivery unit 850 with the items intended for delivery to locations along the first segment 812 of the route 810. The carrier C2 departs the delivery unit 850 at a staggered time, for example, 8:15 AM, with items for delivery along segment 822, and the carrier C3 departs the delivery unit 850 at a staggered time, for example, 8:30 AM, with items intended for delivery along the segment 832. The carriers C1, C2, and C3 can depart the delivery facility on foot, or via the vehicle 800. In some embodiments, the start times are staggered to allow the vehicle 800 time to transit between routes. For example, in some embodiments, the vehicle 800 drives the carrier C1 to route 810, then returns to the delivery unit 850 to pick up the carrier C2, and delivers the carrier C2 to route 820, and so on.

After the Carrier C3 is dropped off at route 830, for example, at stop C3S1, the vehicle 850 returns to the delivery unit 850, where it is loaded with items intended for second delivery segments 814, 824, and 834. In some embodiments, the carriers depart the delivery unit 850 on foot, or by other means, and the vehicle 800 is loaded with these items at the delivery unit 850 before departing. The vehicle 800 can be configured to meet the carriers C1, C2, and C3 at designated stops C1S2, C2S2, and C1S3 to allow the carriers C1, C2, and C3 to get the items intended for delivery to the second segments 814, 824, and 834. When the carriers C1, C2, and C3 have retrieved these items from the vehicle 800, the carriers C1, C2, and C3 continue with the second segments 814, 824, and 834 of their routes 810, 820, and 830. The vehicle 800 replenishes the carriers C1, C2, and C3 on a staggered basis, to allow time for the vehicle to transit between stops C1S2, C2S2, and C3S3 without making the carriers C1, C2, and C3 wait. After replenishing the carriers C1, C2, and C3, the vehicle 800 returns to the delivery unit 850 to load the items intended for delivery along the third segments 816, 826, and 836.

The carriers C1, C2, and C3 have mobile delivery devices as described elsewhere herein, that can track the location of the carriers C1, C2, and C3. The mobile delivery devices send the carriers' location to the vehicle 800, either directly or via a computer network, to alert the vehicle to the carrier's location. By knowing the location of the carriers C1, C2, and C3, the vehicle 800 can then plan or time its departure from the delivery unit 850 or from a previous designated stop, to coincide with the time when the carriers C1, C2, or C3 is at a delivery spot, such as C1S2, C2S2, or C3S2.

To illustrate, an exemplary delivery day will be described with reference to FIG. 8. When the inventory of items to be delivered along routes 810, 820, and 830 is determined, the routes are divided into segments, and designated stops, such as C1S2, and C1S3, are determined, based on the inventory of items and the time of completion as described herein. On the exemplary day depicted in FIG. 8, routes 810, 820, and 830 have been divided into 3 segments each, and two replenishment stops have been established for each route.

Carriers C1, C2, and C3 begin the day at the delivery unit 850. The carriers C1, C2, and C3 retrieve, load, or obtain items intended for delivery along the first segments 812, 822, and 832 of their routes 810, 820, and 830, respectively. Carrier C1 departs at 8:00 AM to start the route 810. Carrier C2 departs at 8:15 AM, staggered from carrier C1's departure time. Carrier C3 departs, again staggered, at 8:30 AM.

The vehicle 800 is loaded at the delivery unit 850 with items for the second segments 814, 824, and 834. The vehicle 800 determines its distance from the first designated stop C1S2. When the mobile delivery device determines that the carrier C1 is a predetermined time from arriving at the first designated stop C1S2, the vehicle 800 will depart the deliver unit 850 to rendezvous with the carrier C1 at the first designated stop C1S2. The vehicle 800 travels along path 841 and meets the carrier C1 at the designated stop C1S2. The carrier C1 obtains the items for the second segment 814, and continues with the route 810.

The vehicle 800 receives location information regarding the location of the second carrier C2, and determines the time it will take the vehicle to travel to designated stop C2S2. When the mobile delivery device of carrier C2 indicates that carrier C2 will arrive at C2S2 at within predetermined time, or time window, the vehicle 800 departs the designated stop C1S2 and travels along path 842 to meet the carrier C2 at designated stop C2S2. In some embodiments, the vehicle 800 can drive to the designated stop C2S2 after the carrier C1 obtains the items from the vehicle 800, and continues along path 842 to designated stop C2S2, where the vehicle 800 can await the arrival of the carrier C2.

The carrier C2 obtains the items for second segment 824 and continues his route. The vehicle 800 determines when the carrier C3 will be at the designated stop C3S2 and departs stop C2S2 to meet the carrier C3. In some embodiments, the vehicle departs stop C2S2 after the items are retrieved by carrier C2. The vehicle 800 travels along path 843 to designated stop C3S2, where the carrier C3 obtains the items for delivery to the second segment 834. When the carrier C3 has retrieved the items from the vehicle 800, the vehicle 800 travels along path 844 back to the delivery unit 850.

At the delivery unit, the vehicle 800 is loaded with items intended for delivery to delivery points along the third segments 816, 826, and 836 of routes 810, 820, and 830. The process described with regard to second designated stops C1S2, C2S2, and C3S2 are repeated, as the vehicle travels along path 845 to arrive at stop C1S3, path 846, to arrive at stop C2S3, and path 847, to arrive at stop C3S3. The vehicle 800 replenishes the carriers C1, C2, and C3 at these stops, and the vehicle 800 then returns to the delivery unit 850 along path 848.

When the carriers complete their routes, they return to the delivery unit 850. In some embodiments, the vehicle 800 can again travel to the endpoints of the delivery routes and pick up the carriers C1, C2, and C3. This can occur at staggered end times, picking up carrier C1 at 4:00 PM, picking up carrier C2 at 4:15 PM, and picking up carrier C3 at 4:30 PM.

In some embodiments, the vehicle 800 carries items intended for more than one route, as described above. To improve security and/or to improve ease of access, items intended for delivery to each route can be placed in a container or receptacle, or portion of the vehicle to which access is restricted. For example, the container or portion of the vehicle containing items for route 810 can only be accessed by the carrier C1 assigned to route 810. This can be accomplished using an electronic lock, and using the carrier's mobile delivery device to act as a key to the lock. For example, the mobile delivery device knows which route the carrier is working based on a log-in, a route identification, and GPS breadcrumb data as the carrier C1 traverses the route. The route information can be communicated to the electronic lock to confirm that the person requesting access is authorized and is the carrier C1. In this way, a carrier cannot accidentally retrieve the wrong items from the vehicle. For example, carrier C2, who is servicing route 820, will not be authorized to open the container or receptacle containing the items for delivery along route 810.

Additionally, as the vehicle 800 an autonomous vehicle, having an electronic lock openable using the mobile delivery device as described, can prevent or deter theft of items from the vehicle as it is traveling.

In some embodiments, C1, C2, and C3 can be mail delivery vehicles which are driven by carriers, and the vehicle 800 can be a truck or other vehicle that meets with the carrier delivery vehicles to replenish the carrier delivery vehicles. A person of skill in the art will understand that the systems and methods described herein can be applied to any level of a distribution network without departing from the scope of the disclosure.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 111 typically has conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for delivering items comprising:
    assigning a first delivery resource to a first delivery route, the first delivery route comprising a first segment and a second segment, the first and second segments divided by a first designated stop, each of the first and second segments comprising a plurality of delivery points;
    assigning a second delivery resource to a second delivery route, the second delivery route comprising a third segment and a fourth segment, the third and fourth segments divided by a second designated stop, each of the third and fourth segments comprising a plurality of delivery points;
    loading, at a distribution facility, items for delivery to the plurality of delivery points in the first segment with the first delivery resource;
    loading, at the distribution facility, items for delivery to the plurality of delivery points in the third segment with second delivery resource;
    loading, at the distribution facility, items for delivery to the plurality of delivery points of the second segment into a first compartment of an autonomous delivery vehicle, wherein the first compartment comprises a first electronic lock configured to restrict access to the first compartment and be unlocked by a mobile computing device of the first delivery resource;
    loading, at the distribution facility, items for delivery to the plurality of delivery points of the fourth segment into a second compartment of the autonomous delivery vehicle, wherein the second compartment comprises a second electronic lock configured to restrict access to the second compartment and be unlocked by a mobile computing device of the second delivery resource;
    commencing delivery by the first delivery resource to the first segment;
    commencing delivery by the second delivery resource to the third segment;
    determining, in a processor, a location of the first delivery resource and an expected time the first delivery resource will arrive at the first designated stop;
    determining, in the processor, a time for dispatching the autonomous delivery vehicle from the distribution facility such the first delivery resource and the autonomous delivery vehicle will arrive at the first designated stop within a first set time window;
    unlocking the first compartment by the first delivery resource at the first designated stop using a mobile computing device of the first delivery resource as an electronic key;
    loading from the autonomous delivery vehicle, items for delivery to the plurality of delivery points of the second segment with the first delivery resource; and
    delivering, by the first delivery resource, the items for delivery to the plurality of delivery points in the second segment.

2. The method of claim 1 further comprising:
    determining, in the processor, the location of the second delivery resource and an expected time the second delivery resource will arrive at the second designated stop;
    determining, in the processor, a time of dispatching the autonomous delivery vehicle from the first designated stop so the second delivery resource and the autonomous delivery vehicle will arrive at the second designated stop within a second set time window;
    loading from the autonomous delivery vehicle, items for delivery to the plurality of delivery points of the fourth segment with the second delivery resource; and
    delivering, by the second delivery resource, the items for delivery to the plurality of delivery points in the fourth segment.

3. The method of claim 2, wherein loading from the autonomous delivery vehicle, items for delivery to the plurality of delivery points of the fourth segment with the second delivery resource comprises unlocking the second compartment by the second delivery resource at the second designated stop.

4. The method of claim 3, wherein unlocking the second compartment comprises using a mobile computing device of the second delivery resource as an electronic key to unlock the second electronic lock.

5. The method of claim 4, further comprising:
    storing, in the first electronic lock, geographic coordinates of the first designated stop; and
    storing, in the second electronic lock, geographic coordinates of the second designated stop.

6. The method of claim 5, wherein unlocking the first compartment using the mobile computing device of the second delivery resource as an electronic key comprises:
comparing, in the first electronic lock, the geographic location of the mobile computing device of the first delivery resource with the stored geographic coordinates of the first designated stop; and
unlocking the first electronic lock on the first compartment only when the geographic location of the mobile computing device of the first delivery resource is within a threshold distance of the stored geographic coordinates of the first designated stop; and
wherein unlocking the second compartment using the mobile computing device of the second delivery resource as an electronic key comprises:
comparing, in the second electronic lock, the geographic location of the mobile computing device of the second delivery resource with the stored geographic coordinates of the second designated stop; and
unlocking the second electronic lock only when the geographic location of the mobile computing device of the second delivery resource is within a threshold distance of the stored geographic coordinates of the second designated stop.

7. The method of claim 1, wherein commencing delivery by the second delivery resource to the third segment occurs at a set time after the first delivery resource has commenced delivery.

8. The method of claim 1, further comprising:
delivering in the autonomous delivery vehicle, the first delivery resource, to a first stop of the plurality of stops in the first segment; and
returning the autonomous delivery vehicle to the distribution facility prior to loading, at the distribution facility, items for delivery to the plurality of delivery points of the second and fourth segments in the autonomous delivery vehicle.

9. A system for delivering items comprising:
an autonomous delivery vehicle;
a first mobile computing device assigned to a first delivery resource;
a second mobile computing device assigned to a second delivery resource;
one or more processors configured to:
assign the first delivery resource to a first delivery route, the first delivery route comprising a first segment and a second segment, the first and second segments divided by a first designated stop, each of the first and second segments comprising a plurality of delivery points;
assign the second delivery resource to a second delivery route, the second delivery route comprising a third segment and a fourth segment, the third and fourth segments divided by a second designated stop, each of the third and fourth segments comprising a plurality of delivery points;
direct loading, at a distribution facility, items for delivery to the plurality of delivery points in the first segment with the first delivery resource;
direct loading, at the distribution facility, items for delivery to the plurality of delivery points in the third segment with the second delivery resource;
direct loading, at the distribution facility, items for delivery to the plurality of delivery points of the second segment into a first compartment of an autonomous delivery vehicle, wherein the first compartment comprises a first electronic lock configured to restrict access to the first compartment and be unlocked by the first mobile computing device;
allow unlocking the first compartment by the first delivery resource at the first designated stop using a mobile computing device of the first delivery resource as an electronic key;
direct loading, at the distribution facility, items for delivery to the plurality of delivery points of the fourth segment into a second compartment of the autonomous delivery vehicle, wherein the second compartment comprises a second electronic lock configured to restrict access to the second compartment and be unlocked by the second mobile computing device;
determine the location of the first delivery resource and an expected time the first delivery resource will arrive at the first designated stop;
determine a time for dispatching the autonomous delivery vehicle from the distribution facility such the first delivery resource and the autonomous delivery vehicle will arrive at the first designated stop within a first set time window;
dispatch the autonomous vehicle to the first designated stop at the determined time; and
send instructions to the first mobile computing device for the first delivery resource to load, from the autonomous delivery vehicle, items for delivery to the plurality of delivery points of the second segment.

10. The system of claim 9 wherein the processor is further configured to:
determine the location of the second delivery resource and an expected time the second delivery resource will arrive at the second designated stop;
determine a time of dispatching the autonomous delivery vehicle from the first designated stop so the second delivery resource and the autonomous delivery vehicle will arrive at the second designated stop within a second set time window;
dispatch the autonomous delivery vehicle from the first designated stop to the second designated stop; and
send instructions to the second mobile computing device for the second delivery resource to load from the autonomous delivery vehicle, items for delivery to the plurality of delivery points of the fourth segment.

11. The system of claim 9, wherein the second mobile computing device comprises an electronic lock key configured to open the second electronic lock.

12. The system of claim 11, wherein the first electronic lock stores geographic coordinates of the first designated stop, and wherein the second electronic lock stores geographic coordinates of the second designated stop.

13. The system of claim 12, wherein the first electronic lock is configured to:
receive, from the first mobile computing device, a geographic location of the first mobile computing device;
compare the geographic location of the first mobile computing device to the geographic coordinates of the first designated stop; and
unlock the first compartment only when the geographic location of the first mobile computing device is within a threshold distance of the geographic coordinates of the first designated stop.

14. The system of claim 13, wherein the second electronic lock is configured to:

receive, from the second mobile computing device, a geographic location of the second mobile computing device;

compare the geographic location of the second mobile computing device to the geographic coordinates of the first designated stop; and unlock the second compartment only when the geographic location of the second mobile computing device is within a threshold distance of the geographic coordinates of the second designated stop.

15. The system of claim 9, wherein the processor is further configured to:

dispatch, in the autonomous delivery vehicle, the first delivery resource to a first stop of the plurality of stops in the first segment; and to direct the autonomous delivery vehicle to return to the distribution facility from the first stop of the plurality of stops in the first segment prior to directing loading, items for delivery to the plurality of delivery points of the second and fourth segments in the autonomous delivery vehicle.

16. A system for delivering items comprising:

means for assigning a first delivery resource to a first delivery route, the first delivery route comprising a first segment and a second segment, the first and second segments divided by a first designated stop, each of the first and second segments comprising a plurality of delivery points;

means for assigning a second delivery resource to a second delivery route, the second delivery route comprising a third segment and a fourth segment, the third and fourth segments divided by a second designated stop, each of the third and fourth segments comprising a plurality of delivery points;

means for loading, at a distribution facility, items for delivery to the plurality of delivery points in the first segment with the first delivery resource;

means for loading, at the distribution facility, items for delivery to the plurality of delivery points in the third segment with the second delivery resource;

means for loading, at the distribution facility, items for delivery to the plurality of delivery points of the second segment into a first compartment of an autonomous delivery vehicle, wherein the first compartment comprises a first electronic lock configured to restrict access to the first compartment;

means for loading, at the distribution facility, items for delivery to the plurality of delivery points of the fourth segment into a second compartment of the autonomous delivery vehicle, wherein the second compartment comprises a second electronic lock configured to restrict access to the second compartment;

means for determining the location of the first delivery resource and an expected time the first delivery resource will arrive at the first designated stop;

means for determining a time for dispatching the autonomous delivery vehicle from the distribution facility such the first delivery resource and the autonomous delivery vehicle will arrive at the first designated stop within a first set time window;

means for unlocking the first compartment by the first delivery resource at the first designated stop using a mobile computing device of the first delivery resource as an electronic key; and means for loading from the autonomous delivery vehicle, items for delivery to the plurality of delivery points of the second segment with the first delivery resource.

* * * * *